United States Patent
Schondelmaier et al.

(10) Patent No.: US 7,075,446 B2
(45) Date of Patent: Jul. 11, 2006

(54) METHOD AND APPARATUS FOR MONITORING MOTOR ROTATION SPEED

(75) Inventors: Hans-Dieter Schondelmaier, Georgen (DE); Arnold Kuner, Georgen (DE); Frank Jeske, Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 188 days.

(21) Appl. No.: 10/489,399

(22) PCT Filed: Dec. 5, 2002

(86) PCT No.: PCT/EP02/13771

§ 371 (c)(1),
(2), (4) Date: Mar. 11, 2004

(87) PCT Pub. No.: WO03/055030

PCT Pub. Date: Jul. 3, 2003

(65) Prior Publication Data

US 2004/0246138 A1    Dec. 9, 2004

(30) Foreign Application Priority Data

Dec. 10, 2001   (DE) ................................ 101 60 564

(51) Int. Cl.
*G08B 21/00*  (2006.01)
(52) U.S. Cl. ............. 340/648; 340/670; 340/680; 340/686.3; 340/661; 340/669; 340/507; 340/441
(58) Field of Classification Search ............. 340/648, 340/661, 669, 670, 672, 686.3, 679, 680, 340/441, 507; 318/138, 439, 599, 609, 700, 318/706, 779, 799; 388/804, 806; 324/109, 324/772
See application file for complete search history.

(56) References Cited

U.S. PATENT DOCUMENTS

| | | | |
|---|---|---|---|
| 5,650,697 A * | 7/1997 | Imagi et al. ................. 318/254 |
| 5,739,761 A * | 4/1998 | Kobayashi .................... 701/35 |
| 5,845,045 A | 12/1998 | Jeske et al. ................. 388/804 |
| 6,481,387 B1 * | 11/2002 | Sano .......................... 123/41.1 |
| 6,580,284 B1 * | 6/2003 | Eckardt ....................... 324/772 |

FOREIGN PATENT DOCUMENTS

JP        05-008 962 A       1/1993

OTHER PUBLICATIONS

Patent Abstracts of Japan, English abstract of JP 05-008 962, Yamamoto/Fuji Electric, "Abnormal Speed Protecting Circuit for Elevator," pub. Jan. 1993.

* cited by examiner

*Primary Examiner*—Hung Nguyen
(74) *Attorney, Agent, or Firm*—Milton Oliver, Esq.; Ware Fressola Van Der Sluys & Adolphson LLP

(57) ABSTRACT

The invention concerns a method for generating an alarm signal in a motor which comprises a rotor (50) whose actual rotation speed during operation lies in a normal zone (nSoll, TSoll), can deviate from that normal zone in the event of a fault, and is to be monitored against a malfunction or fault state, comprising the following steps: At least one alarm switch-on rotation speed (nAOn, TAOn) and at least one alarm switch-off rotation speed (nAOff, TAOff) are defined, of which the latter is located closer to the normal zone than the former, an associated pair of alarm switch-on rotation speed and alarm switch-off rotation speed defining between them a hysteresis zone. When the rotation speed to be monitored arrives, coming from the hysteresis zone, at the alarm switch-on rotation speed, an alarm switch-on criterion (Flag DIR=0) is generated. The duration of this alarm switch-on criterion is monitored. When this duration reaches a predetermined value (tdOn), an alarm signal (ALARM) is activated (FIG. 13: S186, S194). A corresponding microprocessor-controlled motor can be used to implement the method.

35 Claims, 14 Drawing Sheets

METHOD AND APPARATUS FOR MONITORING MOTOR ROTATION SPEED

CROSS-REFERENCE

This application is a section 371 of international application PCT/EP02/13771, whose international filing date is 5 Dec. 2002, and which was published in German on 3 Jul. 2003. The international application claims priority from German application DE 101 60 564.1, filed 10 Dec. 2001, the entire contents of which is hereby incorporated by reference.

FIELD OF THE INVENTION

The present invention relates to a method of detecting when speed of a motor deviates from a standard range, and generating an alarm signal.

BACKGROUND

In motors for critical drive applications, e.g. internal combustion engines or electric motors, it is often required that the operating state of the motor be outputted in the form of a signal, e.g.

"Drive system good" or "Drive system bad."

This allows prompt repair or replacement of a defective motor.

This is especially applicable to fans in mobile radio installations, which must be regularly monitored as to whether they are rotating and, if so, whether their rotation speed lies above a predetermined limit that ensures cooling of the mobile radio installation.

It is known from DE 43 40 248 A1 and corresponding U.S. Pat. No. 5,845,045, JESKE, to modify the rotation speed of an electric motor, as a function of the temperature of a sensor, so that the motor runs quickly (e.g. at 4500 rpm) at high sensor temperatures and slowly (e.g. at 1500 rpm) at low temperatures. With this known motor, monitoring is moreover performed at regular intervals as to whether its rotation speed falls below a predetermined alarm rotation speed of, for example, 1000 rpm; and if such is the case, an alarm signal is generated.

SUMMARY OF THE INVENTION

It is an object of the invention to make available a novel method for generating an alarm signal, and a motor for carrying out such a method.

According to the invention, this object is achieved by using an instantaneous rotation speed target value as a basis for calculating an alarm switch-on rotation speed, and periodically testing whether the actual rotation speed lies outside a region defined by the speed target value and the alarm switch-on rotation speed and, if so, generating an alarm switch-on criterion.

Because the alarm switch-on rotation speed is calculated as a function of the instantaneous rotation speed target value, an alarm rotation speed is obtained that "moves" with the rotation speed target value, i.e. when it is hot and the rotation speed target value equals 4500 rpm, the alarm switch-on rotation speed is defined as, for example, 4050 rpm; and when it is cold and the rotation speed target value equals 1500 rpm, then, according to this method, the alarm switch-on rotation speed is defined as e.g. 1350 rpm, i.e. in both cases as, for example, a predetermined percentage of the instantaneous rotation speed target value.

When an alarm signal is generated in the context of such a method, the signal is therefore realistic and indicates, for example, that the rotation speed of a rotor, to which a certain target rotation speed nSoll has been specified, has changed in such a way that it lies outside a permitted region, e.g. has fallen below 90% of nSoll or risen above 130%.

It is very advantageous in the context of such a method that it can be divided into a plurality of short routines. When commutation in an electric motor is controlled by a microprocessor or microcontroller (μC), such short routines can easily be executed at times when the μP/μC is "underemployed," since monitoring of the rotation speed for faults, and output of an alarm signal in the event of a faulty rotation speed, are usually not tasks that must be performed quickly.

A different way of achieving the stated object is achieved in a different way by means of a method for generating an alarm signal in a motor that comprises a rotor whose actual rotation speed during operation lies in a normal zone and can deviate from that normal zone in the event of a fault, and that is to be monitored for a fault condition, having the following steps: At least one alarm switch-on rotation speed and at least one alarm switch-off rotation speed are defined, of which the latter is closer to the normal zone than the former, an associated pair of alarm switch-on rotation speed and alarm switch-off rotation speed defining between them a hysteresis zone; when the rotation speed to be monitored arrives, coming from the hysteresis zone, at the alarm switch-on rotation speed, an alarm switch-on criterion is generated; the duration of that alarm switch-on criterion from its generation is monitored; when that duration reaches a predetermined value, an alarm signal is enabled. Because the duration of the alarm switch-on criterion is monitored, short-duration alarm signals resulting from "artifacts" of any kind—e.g. interference signals or insignificant short-term disruptions—can be "filtered out."

The stated object is achieved in a different way by means of a motor comprising an alarm apparatus for monitoring a deviation of the actual rotation speed of the motor from a rotation speed normal zone, which motor comprises: a rotation speed sensor for sensing a value characterizing the actual rotation speed of the motor; an alarm apparatus which is configured to compare the actual rotation speed with a predetermined alarm switch-on rotation speed and with an alarm switch-off rotation speed differing from the latter, said speeds defining therebetween a hysteresis zone, and to activate an alarm switch-on criterion when the alarm switch-on rotation speed is reached; and comprising a timing member for monitoring the alarm switch-on criterion, which timing member is configured to enable an alarm signal after the alarm switch-on criterion has been activated for a predetermined time span. The result is that the number of false alarms can be greatly reduced, since such false alarms are substantially filtered out in such a motor.

Further details and advantageous refinements of the invention may be inferred from the exemplary embodiments, in no way to be understood as a limitation of the invention, that are described below and depicted in the drawings.

BRIEF FIGURE DESCRIPTION

FIG. 1 is a set of graphs, plotted on a common time axis, to explain processes in the generation of an alarm signal;

FIG. 2 shows how curves for an alarm switch-on limit 46 and an alarm switch-off limit 44 are calculated from a rotation speed target value curve 32;

FIG. 3 schematically depicts an electric motor that has a four-pole permanent-magnet rotor 50;

FIG. 4 schematically depicts a HALL signal that is generated by rotor 50 in a Hall IC 60;

DETAILED DESCRIPTION OF THE PREFERRED EMBODIMENTS

Figure 1:
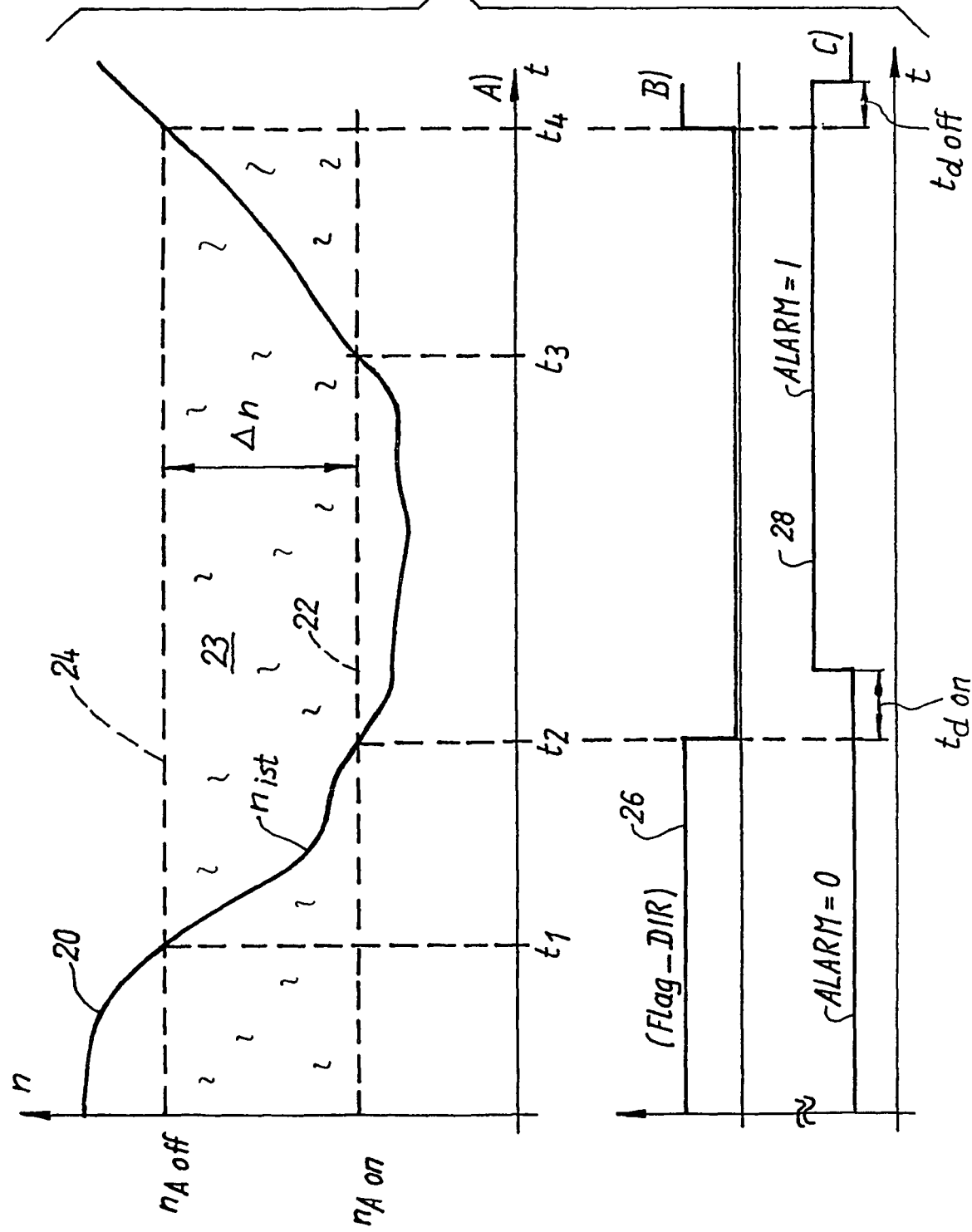

In the description that follows, identical or identically functioning parts are designated using the same reference characters, and are usually described only once.

FIG. 1, to explain the problems in the context of an alarm, shows at A) a rotation speed characteristic curve 20 that can represent, for example, the rotation speed profile of a faulty motor, in the course of a day, an hour, or a minute.

FIG. 1A depicts two rotation speed limits, namely a constant alarm switch-on rotation speed (nAOn) 22 and a constant alarm switch-off rotation speed (nAOff) 24, which define between them a hysteresis zone 23. Rotation speeds nAOn and nAOff usually have a difference of at least 100 rpm, and this hysteresis zone 23 brings about a switching hysteresis, i.e. only a greater rotation speed difference Δn can cause an ALARM signal, previously generated by the rotation speed falling below naOn (FIG. 1C), to be switched off again after rotation speed nAOff is exceeded.

At time t1, rotation speed 20 falls below rotation speed nAOff; this causes no changes. At time t2, rotation speed 20 also falls below rotation speed nAOn. This results in generation of an alarm criterion 26, whose duration starting from time t2 is monitored. (A direction flag Flag_DIR will be used below as the alarm criterion.) If, within a period tdOn, rotation speed 20 again becomes greater than alarm switch-on rotation speed 22, no alarm signal is generated. If, however, alarm criterion 26 remains active for a time greater than or equal to time tdOn, then an alarm signal 28 (ALARM=1) is generated. Time tdOn is referred to as the alarm switch-on delay time.

After a certain time, actual rotation speed 20 in FIG. 1 increases again and, at time t3, exceeds alarm switch-on rotation speed nAOn. Because of the switching hysteresis Δn, nothing happens here. At time t4, actual rotation speed 20 also exceeds alarm switch-off rotation speed nAOff. At this point in time, alarm criterion 26 is reset, but the ALARM=1 signal persists. Only when alarm criterion 26 has been switched off, for longer than a time tdOff, is signal 28 also switched over to ALARM=0. If, however, very shortly after time t4, rotation speed 20 again drops below rotation speed nAOff, signal 28 retains the value ALARM=1. Time tdOff is referred to as the alarm switch-off delay time.

Delay times tdOn and tdOff, which in most cases are different, are usually in the range from 0.5 to 65 seconds, depending on the type of drive system. If time tdOn is set to infinity, once an alarm has been stored it remains stored until it has been canceled by an operator, i.e. by means of a manual reset operation.

Figure 2:
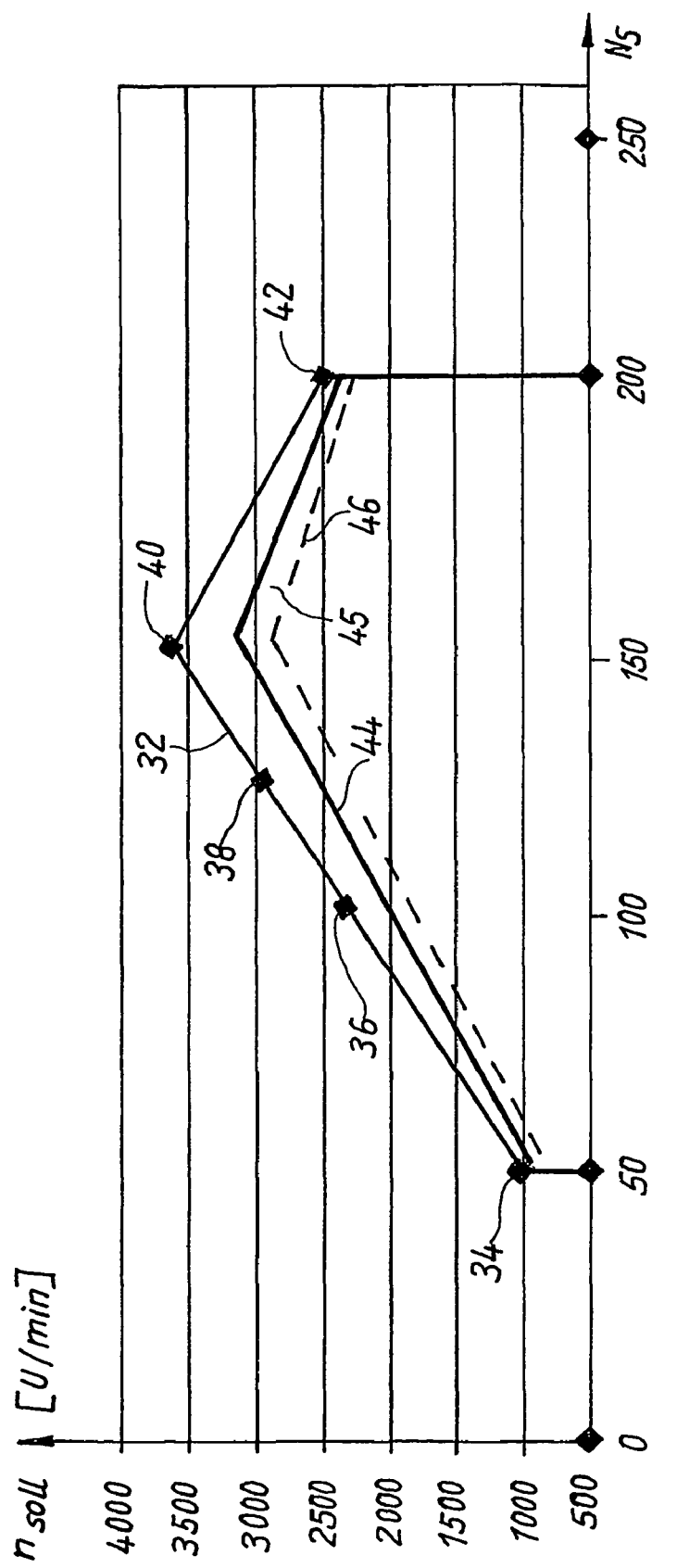

FIG. 2 is a graph to explain a preferred embodiment of the invention. Plotted on the horizontal axis is a value NS that here is between 0 and 255 and represents a standardized variable or parameter that is derived from a target value, e.g. a DC voltage, a temperature, a pressure, etc. For example, if a temperature lies between 0 and 100° C., it is first converted to a digital value NS, in which context, for example, 0° may correspond to a digital value of 0, and 100° C. may correspond to a digital value of 255.

These digital values are converted, by means of a stored table, into desired rotation speeds, i.e. rotation speed target values, so that in FIG. 2, for example, the resulting correspondences are as follows:

| Digital value | Rotation speed target value (rpm)* | |
| --- | --- | --- |
| | nSoll | TSoll |
| 0–49 | 500 | 120,000.0 µs |
| 50 | 1000 | 60,000.0 µs |
| 100 | 2250 | 26,666.7 µs |
| 125 | 3000 | 20,000.0 µs |
| 150 | 3600 | 16,666.7 µs |
| 200 | 2500 | 24,000.0 µs |
| 201–255 | 500 | 120,000.0 µs |

*The rotation speed target values are preferably stored in the form of the time TSoll required by a rotor 50 (FIG. 4) for one revolution at the desired rotation speed nSoll. Since very long times are obtained for low rotation speeds, e.g. a time of 120,000 µs for 500 rpm, times TSoll > 60,000 µs (corresponding to nSoll < 1,000 rpm) are interpreted as nSoll = 0, i.e. in the table above, the indication 120,000 µs is interpreted as 0 rpm.

This yields a target rotation speed characteristic curve 32 that is depicted in FIG. 2 and is defined by a total of five points 34, 36, 38, 40, and 42. Associated with this target rotation speed characteristic curve 32 are a characteristic curve 44 that defines alarm switch-off rotation speed nAOff, and a characteristic curve 46 that defines alarm switch-on rotation speed nAOn. Located between characteristic curves 44 and 46 is a hysteresis zone 45. For example, the rotation speeds of characteristic curve 44 correspond to approximately 87.5% of the target rotation speed, and the rotation speeds of characteristic curve 46 to approximately 80% of target rotation speed 32.

For example, if nSoll has a value of 360° rpm at point 40, then an ALARM=1 signal 28 is switched on when actual rotation speed nist drops below 2900 rpm during the time tdON, and it is switched off again when nist has again risen above 3100 rpm during a time tdOff.

If, however, nSoll has a value of 2500 rpm at point 42, then the alarm is switched on at 2000 rpm and is switched off again when nist then rises again above 2190 rpm.

In this embodiment, the alarm limits thus "move" along with the instantaneous rotation speed target value nSoll, so that the occurrence of an alarm signal represents a much more sophisticated indication, as compared with previous solutions, that a fault might have occurred. The user of a rotation speed monitoring system of this kind consequently knows much more accurately whether a fault might exist in his drive system, and can take countermeasures more promptly.

The Definition of Rotation Speed Values

Rotation speed values can be defined in various ways. The usual definition is in rpm or rps (revolutions per second).

Figure 3:
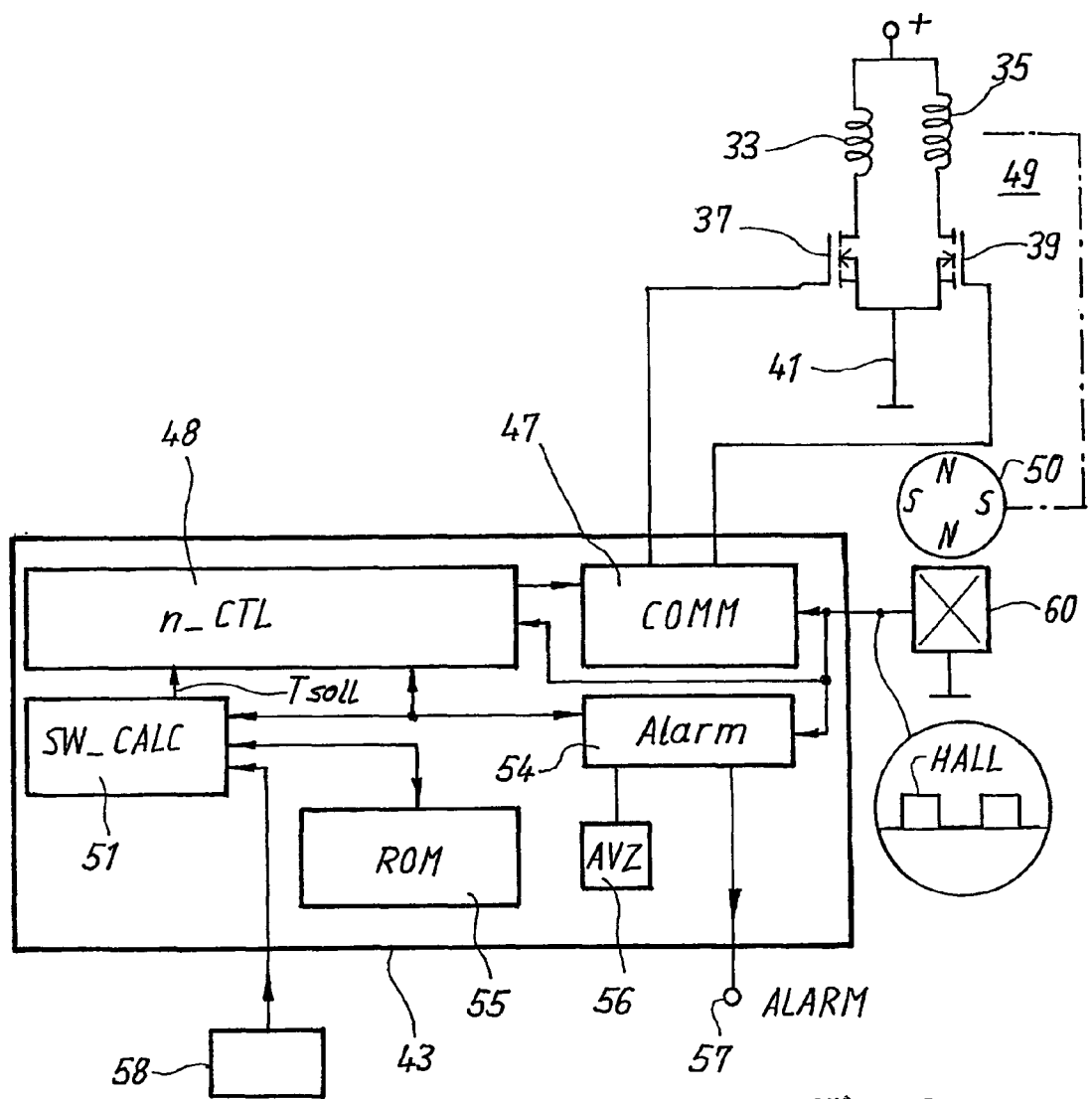
Figure 4:
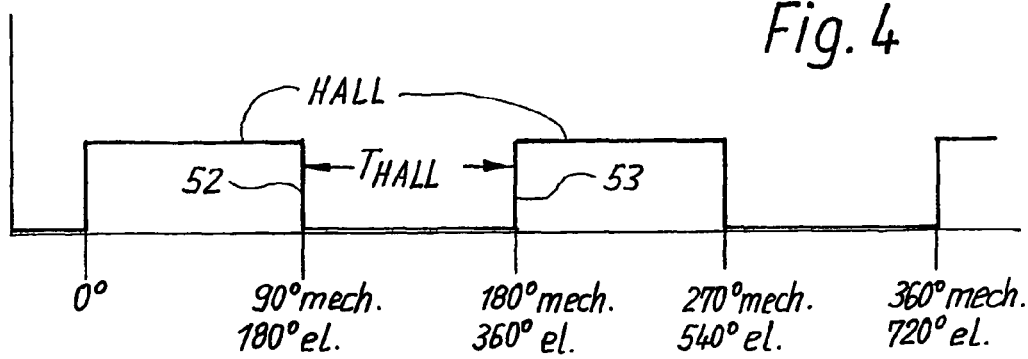

FIG. 3 shows an electric motor 49 having a permanent-magnet rotor 50 that, in this example, has two North poles and two South poles, all of which have a length of 90° mech. It is said in this case, in the terminology of electrical engineering, that the length of a pole is 180° el.; and a Hall IC (Integrated Circuit) 60 that is located opposite rotor 50 generates, upon rotation of the latter, a square-wave HALL signal that is depicted in FIG. 4.

In such a HALL signal, it is easy to measure the distance $T_{HALL}$ between two adjacent edges 52, 53; and this time $T_{HALL}$ corresponds to the time required by rotor 50, at its instantaneous rotation speed, for one quarter of a revolution.

EXAMPLE

Assume that time $T_{HALL}$ is 1 ms=0.001 s. The rotor then requires

4×0.001=0.004 second for one complete revolution, and its rotation speed is

1/0.004=250 rps.

Since one minute contains 60 seconds, the rotor is rotating at a rotation speed of $$(1/0.004) \times 60 = 15{,}000 \text{ rpm}. \quad (1)$$

Since the time for one complete revolution (or indeed for part of a revolution) in the context of an electric motor 49 can be measured easily and with very good accuracy using Hall IC 60, it is preferable, especially in the case of rotation speed controllers for electric motors, to work with the time $T_{HALL}$ or a multiple of it, since this variable can be used directly after it is measured and is in any case needed to control commutation of the motor. This time thus represents, in the context of an electric motor, a more convenient indicator of the rotation speed than any of the other variables such as rpm or rps; and if necessary, $T_{HALL}$ can easily be converted to rpm by taking the reciprocal of the time for one revolution of 360° mech. and multiplying it by 60, i.e.

$$n(\text{rpm}) = 60/T 360° \text{ mech.} \quad (2)$$

The time T used here must be in seconds.

As FIG. 3 shows, electric motor 49 that is depicted has two stator windings 33, 35. Winding 33 is located between positive and ground 41 in series with a MOSFET (Metal Oxide Semiconductor Field Effect Transistor) 37, and winding 35 is in series with a MOSFET 39.

MOSFETs 37, 39 are controlled by a microcontroller (μC) 43 to which the HALL signals from Hall IC 60 are conveyed. μC 43 contains, in the form of program modules that are here indicated only symbolically, a commutation controller 47 "COMM," a rotation speed controller 48 "n-CTL," a calculation member 51 "SW-CALC" for calculating a rotation speed target value TSoll for controller 48, an alarm controller 54 for generating an ALARM signal for the case in which the rotation speed of motor 49 becomes too high or too low, a ROM 55 for storing a program, and an alarm delay counter 56 "AVZ" that coacts with alarm controller 54, the latter having an output 57 for the ALARM signal.

A corresponding signal is conveyed from outside, e.g. from an external sensor 58, to target value calculator 51 and is converted in SW-CALC 51 to a rotation speed target value nSoll or TSoll. This is done, in particular, by means of a table that, for example, can be stored in ROM 55.

The mode of operation is evident from the explanations below. Motor 49 that is depicted is of course only one very simple example of any arbitrary motor—including an internal combustion engine, for example a marine diesel engine—and does not in any way limit the invention.

Calculating Alarm Limits a) Rotation Speed Target Value is Available in rpm

Here the rotation speed target value nSoll and a percentage pA for the desired alarm limit are defined. The formula is then $$nA = nSoll \times pA/100 \quad (3)$$

where nA=alarm rotation speed.

If nSoll (supplied by the rotation speed controller of motor 49) is 4000 rpm and pA=80%, then $$nA = 4000 \times 80/100 = 3200 \text{ rpm} \quad (4)$$

Similarly, when nSoll=4000 rpm and pA=120%:

$$nA = 4000 \times 120/100 = 4800 \text{ rpm} \quad (5).$$

In this case, an alarm is generated when the actual rotation speed increases 20% above nSoll.

b) Rotation Speed is Available as Time TSoll, e.g. Time per Rotor Revolution

In this case the formula for alarm time TA is $$TA = TSoll \times 100/pA \quad (6)$$

For example, a target rotation speed nSoll=6000 rpm=100 rps corresponds to a time TSoll of 0.01 second=10,000 μs per rotor revolution.

If the alarm is to be triggered at a rotation speed of 5400 rpm, i.e. at pA=90%, then $$TA = 0.01 \times 100/90 = 0.0111 \text{ second} = 11{,}100 \text{ μs} \quad (7).$$

In this case, the time TA for the alarm limit of 5000 rpm is greater than the time TSoll.

If the alarm is to be triggered upon reaching 6600 rpm, i.e. at pA=110%, then $$TA = 0.01 \times 100/110 = 0.00909 \text{ second} \quad (8),$$

i.e. in this case, TA is less than TSoll.

Simplified Calculation Algorithm

Particularly fast calculation is achieved using the formula $$TA = TSoll +/- TSoll/x \quad (9).$$

The + sign applies to the case in which the alarm rotation speed is to be less than the rotation speed target value, and the − (minus) sign is for when the alarm rotation speed is to be greater than the rotation speed target value. The number x is preferably a number from the series . . . 1/16, 1/8, 1/4, 1/2, 1, 2, 4, 8, 16 . . . , since these numbers can easily be generated by shifting a stored binary value to the left or right.

Positive Sign (nA<nSoll)

If TSoll=0.01 second, corresponding to a rotation speed target value of 6000 rpm, and if x=2, then $$TA=0.01+0.01/2=0.015 \text{ second} \qquad (10).$$

This corresponds to an alarm rotation speed of 4000 rpm.

For various values of x, the values for the alarm rotation speeds obtained at a rotation speed target value of 6000 rpm are as follows:

| x | Alarm rotation speed (rpm) | nA/nSoll |
|---|---|---|
| . . . | . . . | . . . |
| 1/16 | 353 | 1/17 |
| 1/8 | 666.7 | 1/9 |
| 1/4 | 1200 | 1/5 |
| 1/2 | 2000 | 1/3 |
| 1 | 3000 | 1/2 |
| 2 | 4000 | 2/3 |
| 4 | 4800 | 4/5 |
| 8 | 5333 | 8/9 |
| 16 | 5647 | 16/17 |
| 32 | 5818 | 32/33 |
| . . . | . . . | . . . |

With this algorithm, it is therefore very easy to calculate rotation speed ratios having values of 1/17, 1/9, 1/5, 1/3, 1/2, 2/3, 4/5, 8/9, 16/17, 32/33, etc.

Negative Sign (nA>nSoll)

If alarm rotation speed nA is to be greater than target rotation speed nSoll, then $$TA = TSoll - TSoll/x \qquad (11).$$

For TSoll=0.01 second and x=4, for example:

$$TA=0.01-0.01/4=0.0075 \text{ second} \qquad (12).$$

This corresponds to a rotation speed of 8000 rpm.

In this case, alarm rotation speed nA equals 4/3 of target rotation speed nSoll.

Equation (11) yields, as an example, the following rotation speed ratios:

| x | nA/nSoll |
|---|---|
| . . . | . . . |
| 2 | 2/1 |
| 4 | 4/3 |
| 8 | 8/7 |
| 16 | 16/15 |
| 32 | 32/31 |
| 64 | 64/63 |
| . . . | . . . |

The program is preferably subdivided into short modules that can be executed in the course of the rotation of rotor 50 at various points in that rotation, since the generation or cancellation of an alarm signal has a very low priority as compared with other calculations in motor 49. In addition, calculation of the alarm limits requires that the rotation speed target value first be ascertained. If the latter value is ascertained from a temperature, the instantaneous temperature (see FIG. 2) is first converted to a digital value NS, e.g. in FIG. 2 to the value 105 on the horizontal axis. That value then lies between points 36 and 38, i.e. between 2300 and 3000 rpm; interpolation between these two rotation speeds is therefore necessary, and a target rotation speed nSoll of, for example, 2340 rpm is obtained. In the present case, the rotation speed is preferably indicated as the time TSoll for one rotor revolution, which at 2340 rpm=39 rps has a value of 1/39 second=25,641 μs.

Proceeding from this, times TAOn and TAOff are calculated using equation (9). Assuming x=2 for TAOn and x=4 for TAOff, the times obtained are thus $$TAOn=25641+25641/2=38461.5 \text{ μs} \qquad (13)$$

$$TAOff=25641+25641/4=32051.25 \text{ μs} \qquad (14).$$

Figure 5:
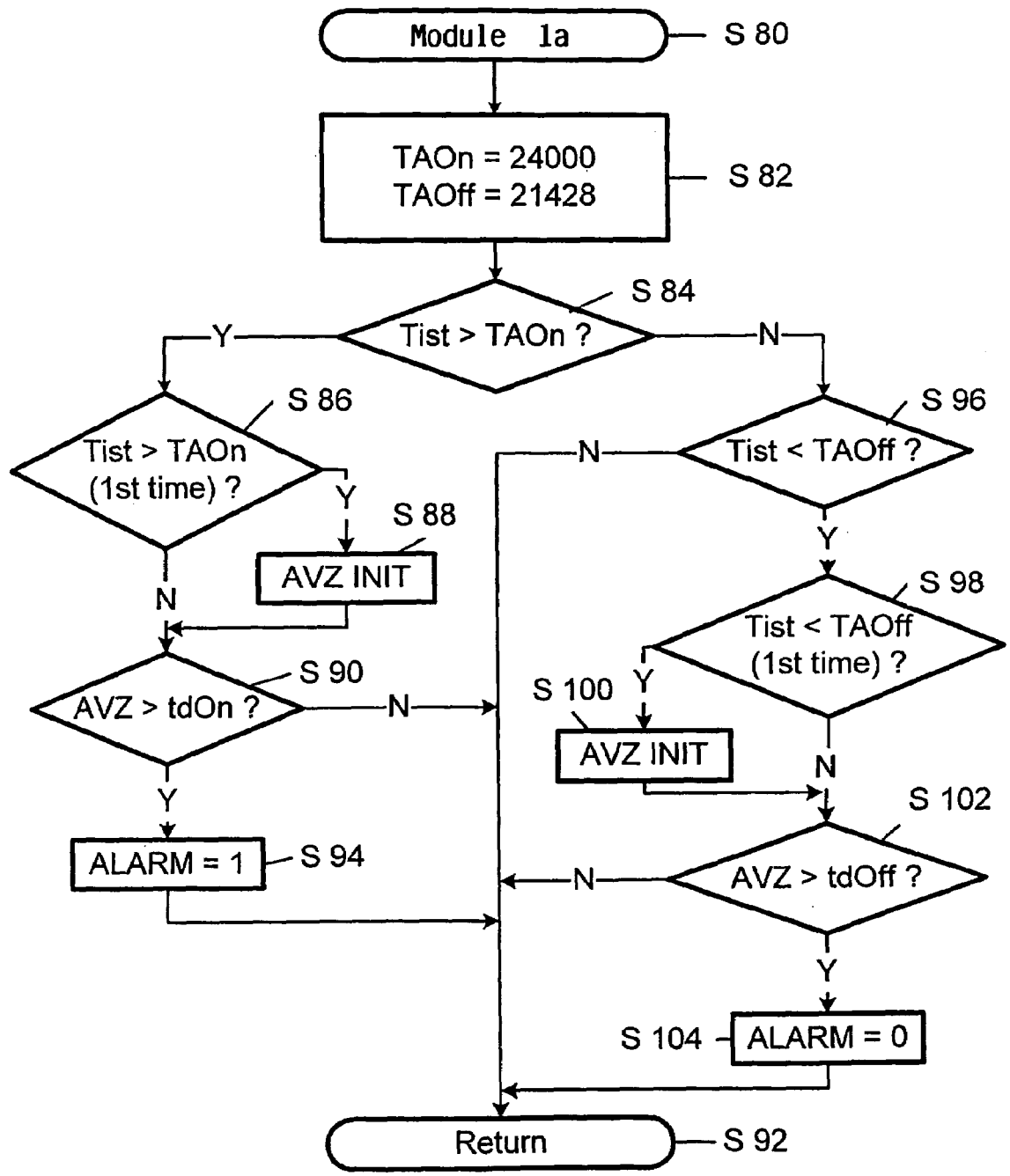
FIG. 5 is the flow chart of a first embodiment of a first module of a program for generating an alarm signal using fixed alarm limits, as depicted in FIG. 1.

FIG. 5 shows, at S80, a first embodiment of a module 1*a* for alarm calculation, the fixed alarm limits being assumed to be 24000 μs (=2500 rpm) and 21428 μs (=2800 rpm). This corresponds to the example of FIG. 1. At S82, times TAOn and TAOff are defined in the manner explained.

S84 checks whether the instantaneous rotation speed nist is less than alarm switch-on rotation speed nAOn. This is done by comparing time Tist (corresponding to four times time $T_{HALL}$ in FIG. 4) with time TAOn calculated in S82.

If the response is Yes, nist is therefore too low and Tist is thus too high, and the program goes to S86, which checks whether the condition Tist>TAOn is met for the first time. If Yes, then in S88 alarm delay counter AVZ 56 is set to 0 and begins to count. The module then goes to step S90, which checks whether the time in AVZ 56 is already greater than time tdOn, which is depicted in FIG. 1C and was explained there.

If it is found in S86 that the condition Tist>TAOn was already identified during a previous pass, the program goes directly to S90.

If it is found in S90 that time tdOn has not yet been reached, the program goes to step S92 (Return). If it is found in S90 that time tdOn has been reached, then ALARM=1 is set in S94 and remains activated until the alarm is canceled again by a change in the rotation speed. Alternatively, provision can also be made for the alarm to remain stored and to be capable of being canceled only manually, even if the rotation speed returns to normal.

If it is found in step S84 that the actual rotation speed is greater than alarm switch-on rotation speed nAOn, the program goes to S96 and checks whether nist>nAOff. This is done by comparing times Tist and TAOff. If No, the program goes directly to S92 Return. If Yes, the program goes to S98 where it checks whether nist is again, for the first time, above nAOff. If Yes, in S100 alarm delay counter AVZ 56 is initialized (i.e. set to zero) and begins to count, and the program goes to S102. If the response in S98 is No, AVZ 56 is already running, and the program goes directly to S102 where it checks whether AVZ 56 has reached the value tdOff (see FIG. 1*c*). If No, the program goes to S92 (Return). If Yes, it goes to S104 and cancels the alarm (ALARM=0), because nist has been back in a non-critical region during time tdOff.

Figure 6:
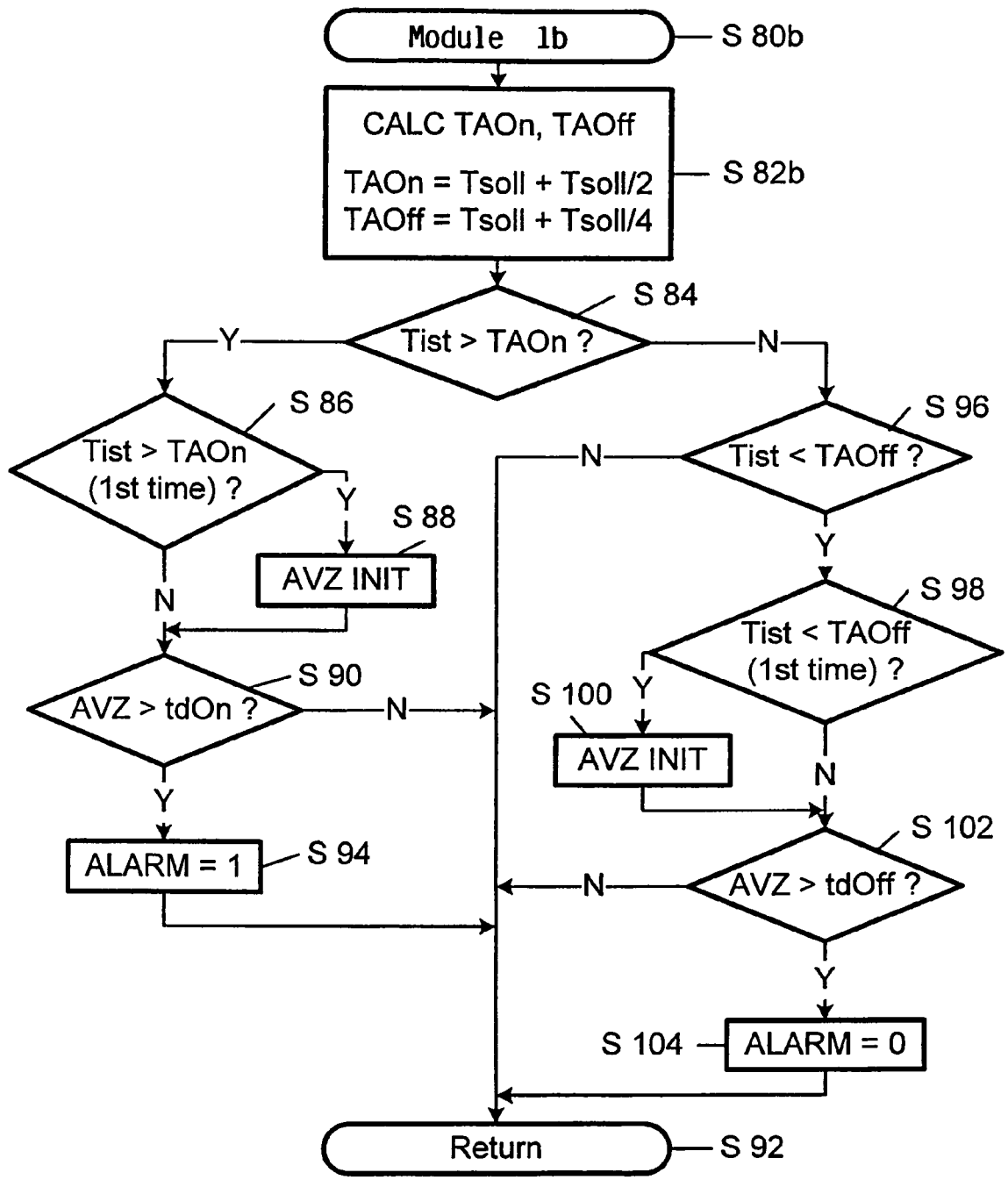
FIG. 6 is the flow chart of a second embodiment of a first module of a program for generating an alarm signal using alarm limits that are lower than the target rotation speed, and are a function of that target rotation speed, as depicted by way of example in FIG. 2.

FIG. 6 shows a module 1*b* that is constructed entirely similarly to module 1*a* of FIG. 5 and serves to implement the "moving" alarm limits that have already been described in detail in conjunction with FIG. 2. The suffix "b" is used for program steps differing from FIG. 5 (e.g. "S80b"); the same reference characters as in FIG. 5 are used for identical program steps, and those program steps are not described again.

In step 82b here, the two alarm times TAOn and TAOff are calculated starting from a (variable) target value TSoll, and are used in the subsequent program steps (which are identical to FIG. 5). The result is alarm limits that here are equal to ⅔ and ⅘ of the instantaneous target rotation speed.

Figure 7:
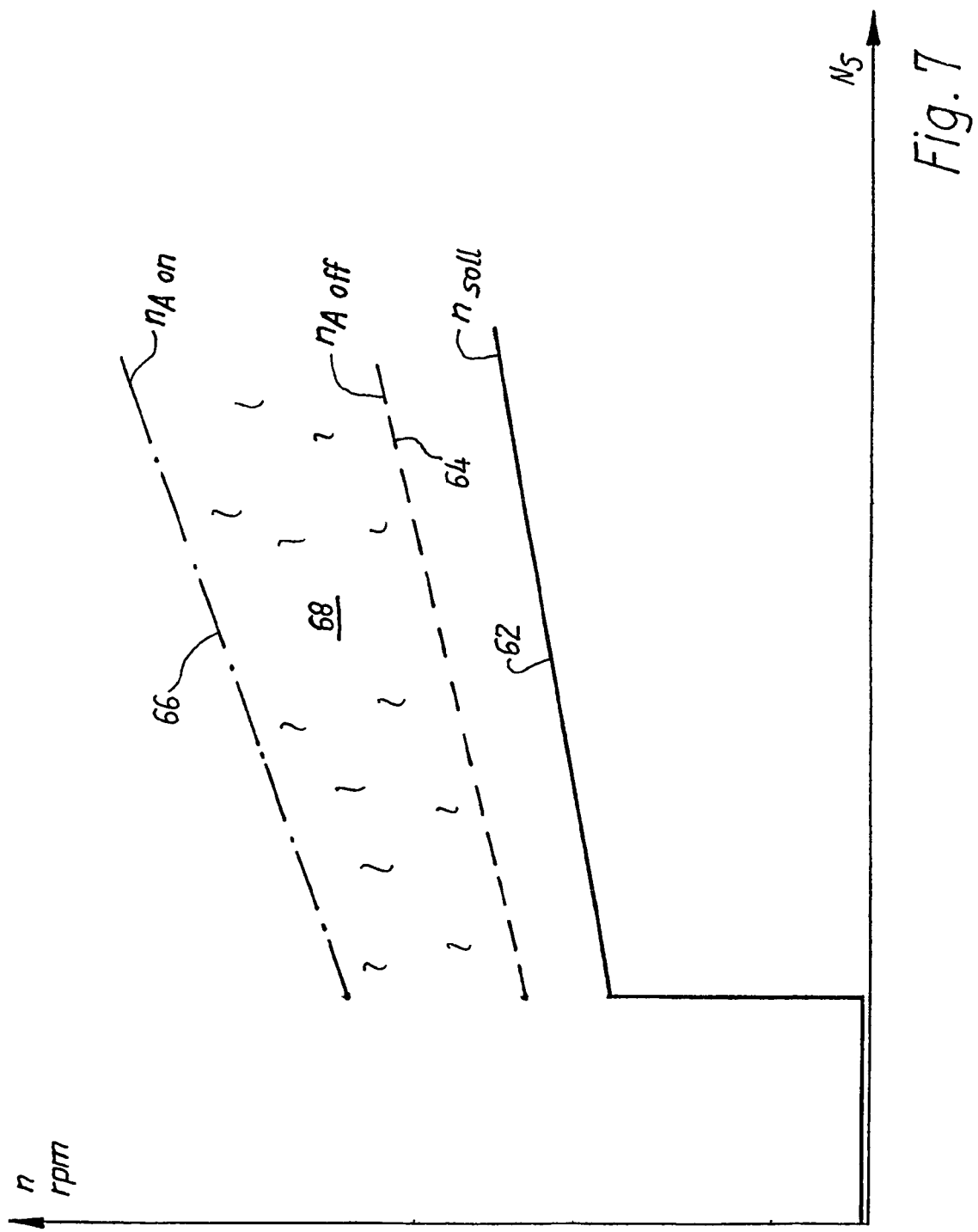
FIG. 7 is a diagram explaining the generation of an alarm signal for the case in which the actual rotation speed of a motor becomes greater than the target rotation speed.

In some drive systems, it may also happen that an alarm must be generated when the relevant motor 49 is running too fast, e.g. in an elevator or in a drive system for an overhead door. FIG. 7 shows this using an example analogous to FIG. 2.

Here, a higher alarm switch-off rotation speed 64 (nAOff) and an even higher alarm switch-on rotation speed 66 (nAOn) are associated with the target rotation speed 62 (nSoll). An upper hysteresis zone 68 is located between rotation speeds 64 and 66.

Figure 8:
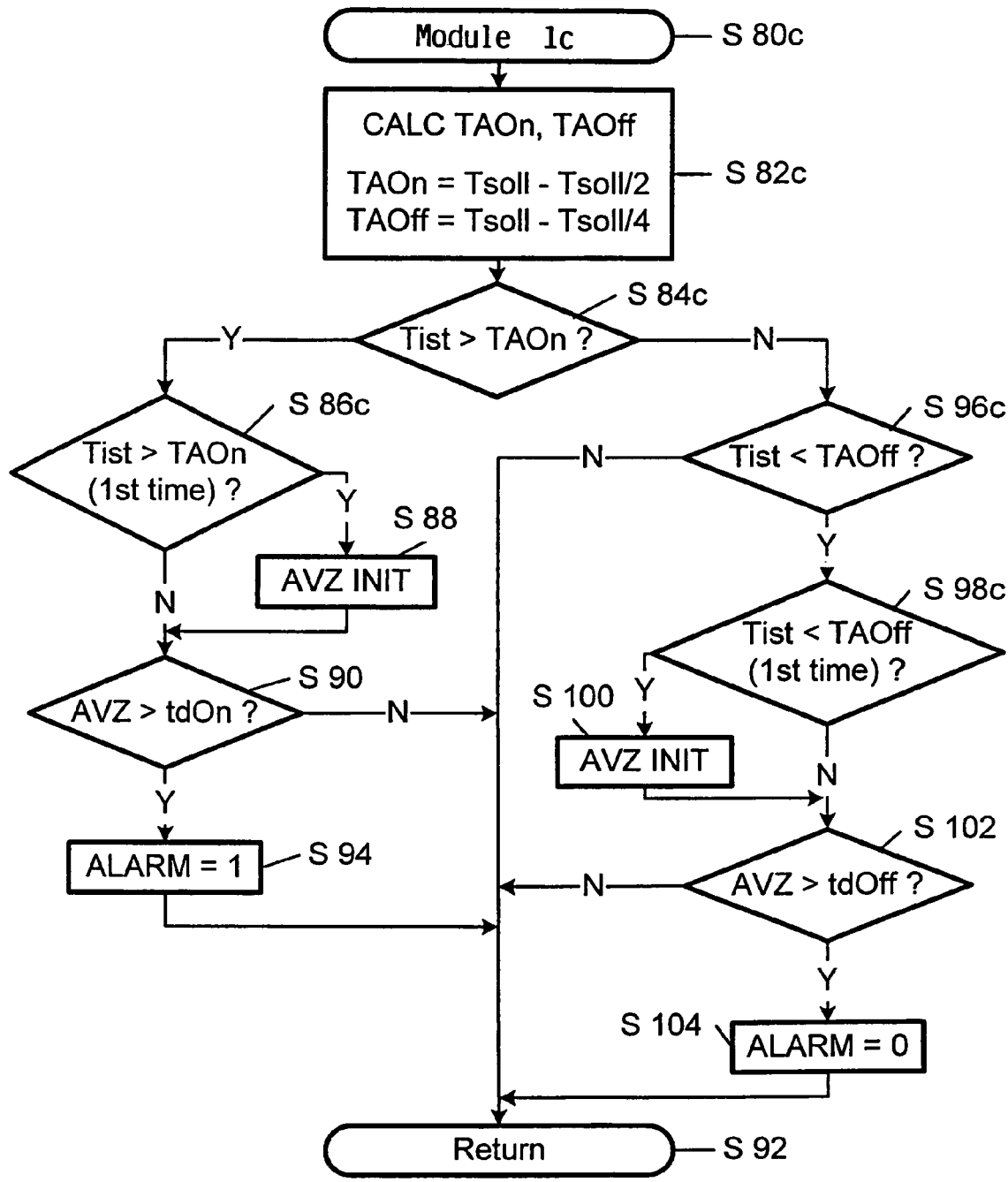
FIG. 8 is a flow chart of a third embodiment of the first module, analogous to FIGS. 5 and 6, for the implementation of FIG. 7.

FIG. 8 shows a module 1c S80c for implementing this type of moving alarm limits. The program steps differing from FIG. 5 are given a "c" suffix, e.g. S80c.

In step S82c, the alarm limits are calculated, alarm switch-on rotation speed nAOn being twice as great as nSoll and alarm switch-off rotation speed nAOff being 33% greater than nSoll (see equation (11) and the numerical example there).

Since the alarm rotation speeds here are greater than nSoll, the polling queries must be the reverse of those in FIG. 5, i.e. S84c and S86c check whether Tist<TAOn, and S96c and S98c check whether Tist>TAOff. The remaining steps are the same as in FIG. 5, to which the reader is therefore referred. An alarm is therefore generated here when motor 49 is running twice as fast as nSoll, and that alarm is switched back off when the rotation speed has dropped into a region below 1.33 times nSoll.

Figure 9:
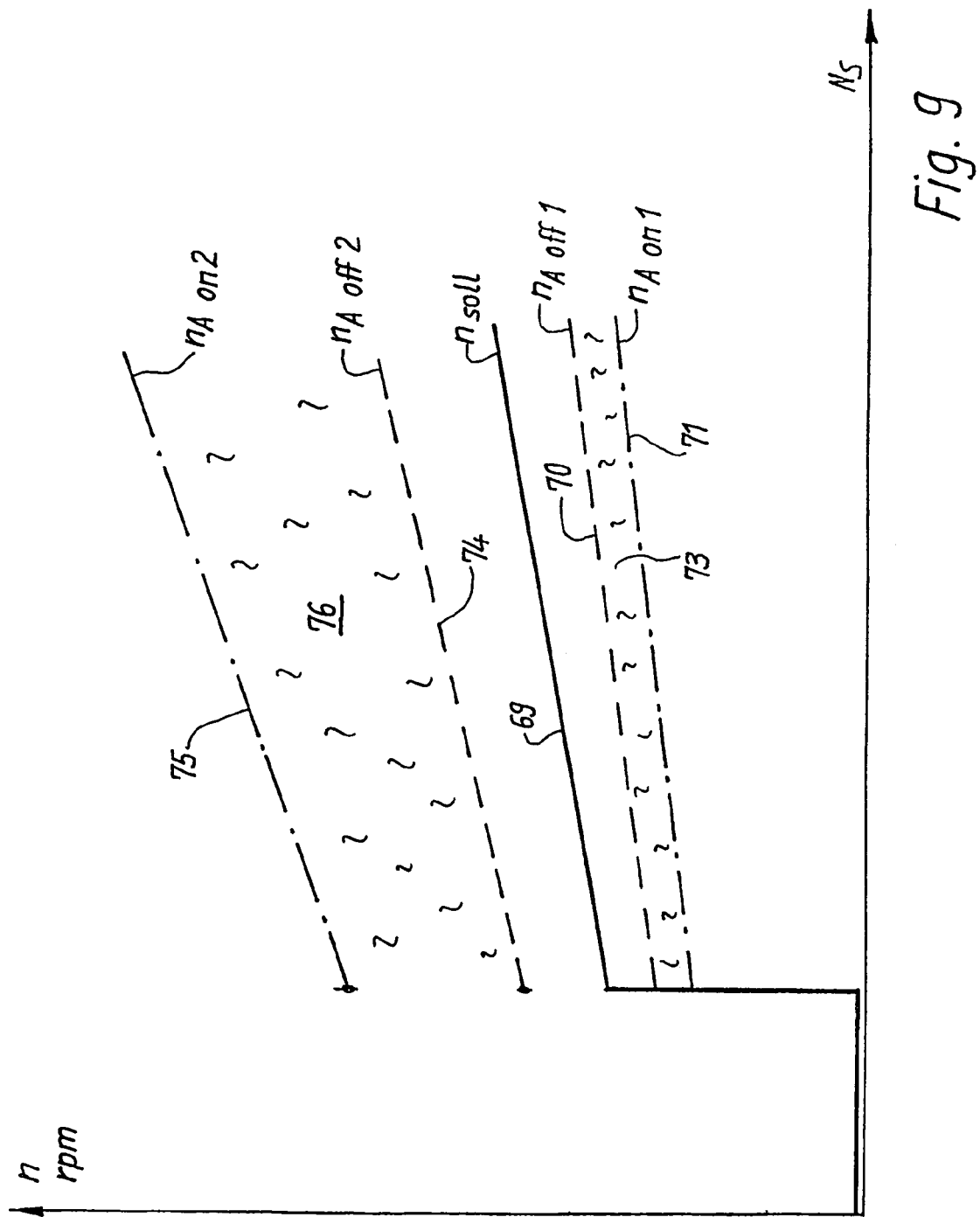
FIG. 9 is a diagram explaining the generation of an alarm signal for the case in which the actual rotation speed of a motor becomes either too high or too low.

In some cases, a combination of the versions according to FIGS. 2 and 6 plus FIGS. 7 and 8 will be required, i.e. an alarm needs to be generated when motor 49 is running too fast but also when it is running too slow. This is depicted in FIG. 9. A motor of this kind has four moving alarm limits nAOn1, nAOff1, nAOn2, and nAOff2, all of which are calculated on the basis of the instantaneous value of target rotation speed nSoll 69. The latter is a function of variable NS as described in FIG. 2, i.e. a function of a temperature, a voltage, or some other variable or parameter. Extending below curve 69 is lower alarm switch-off rotation speed 70 nAOff1, which has ⅘ the value of nSoll; and below that is lower alarm switch-on rotation speed 71 nAOn1, which has ⅔ the value of nSoll. A lower hysteresis zone 73 is located between rotation speeds 70 and 71.

Extending above target rotation speed 79 is upper alarm switch-off rotation speed 74 nAOff2, which lies 33% above the rotation speed values of curve nSoll; and above that is upper alarm switch-on rotation speed 75 nAOn2, whose value is twice that of nSoll. An upper hysteresis zone 76 is located between curves 74 and 75.

An alarm is therefore switched on when the actual rotation speed nist (for a certain value NS) is either >nAOn2 or <nAOn1. If the instantaneous target rotation speed is 2000 rpm, for example, then an alarm is switched on when nist either rises above 4000 rpm or drops below 1333 rpm.

In this example, if the rotation speed is too high, when nist decreases from 4000 rpm to 2665 rpm the "upper" alarm is switched off again. If the rotation speed was too low (so that a lower alarm was therefore generated), and if it rises back above 1600, the "lower" alarm is then switched off.

As described above, the aforementioned alarm rotation speeds can be modified within wide limits by inputting the factors x accordingly. The example according to FIGS. 9 and 10 uses factors x=4 and x=2.

Figure 10:
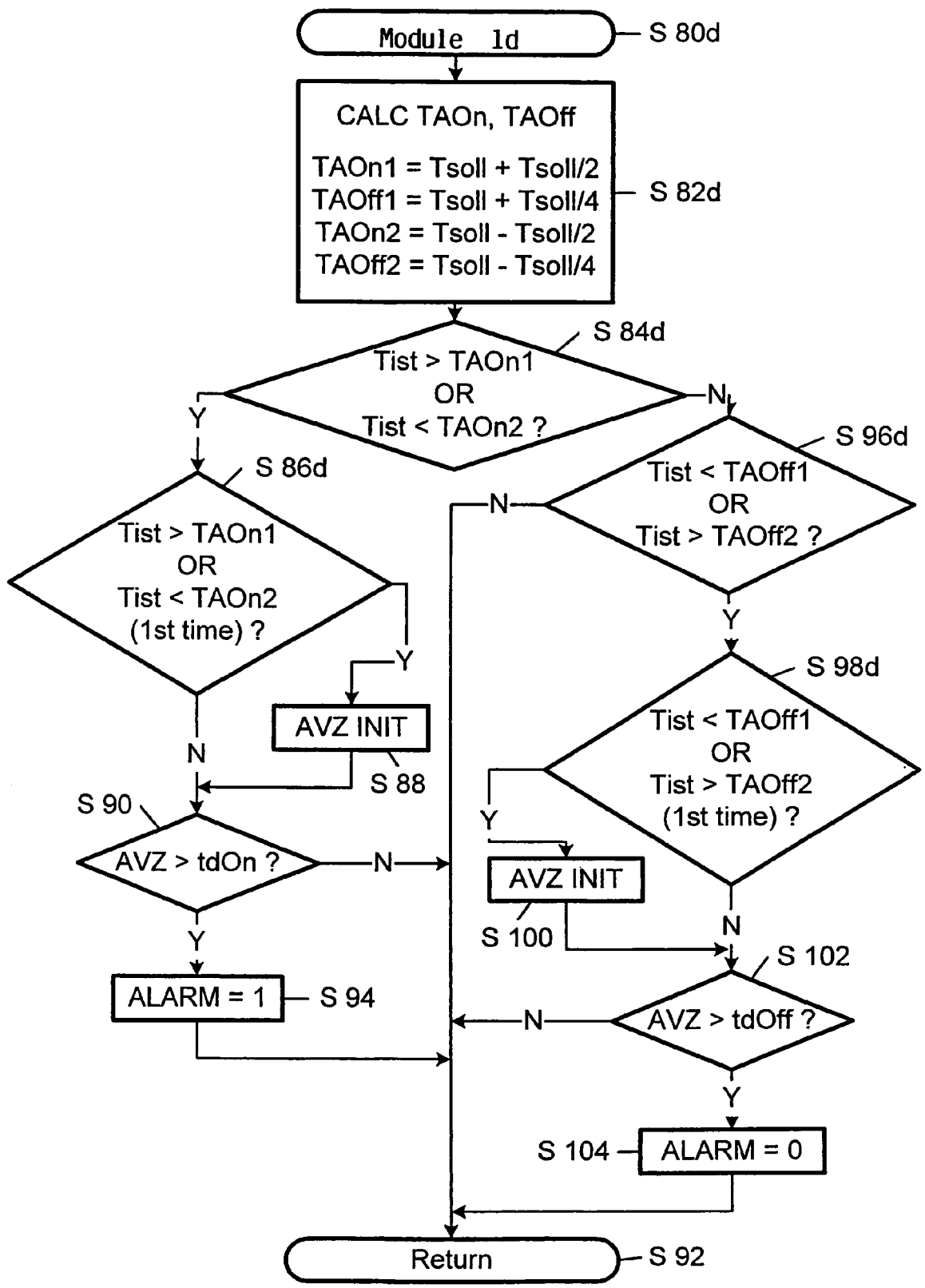
FIG. 10 is a flow chart of a fourth embodiment of the first module, for the implementation of FIG. 9.

FIG. 10 shows module 1d (S80d) for implementing this function. Here again, only those portions differing from FIG. 5 are described.

In S82d, the various alarm rotation speeds (expressed in times for one revolution) are calculated starting from the instantaneous value of the target rotation speed (expressed in times TSoll). This was explained exhaustively earlier in the description. As indicated, the calculation uses values of 2 and 4 for the factor x. This is of course only an example that corresponds to what is indicated in FIG. 9, since an example using concrete numerical values substantially simplifies comprehension of such a complex invention.

S84d checks whether the actual rotation speed lies either below curve 71 or above curve 75 (FIG. 9). If Yes, the module checks in S86d whether this fault is occurring for the first time; if Yes, at S88 AVZ 56 is set to zero and started. At S90 the value of the AVZ is monitored; and when it reaches the time tdOn, the alarm is switched on at S94.

If the response in S84d is No, S96d then checks whether the actual rotation speed lies either between curves 69 and 70 or between curves 69 and 74; if this is the case for the first time, then in S98d, S100 the AVZ is set to zero and started. In S102 the value in AVZ 56 is monitored, and when that value reaches the value tdOff, the alarm is switched off at S104.

It is thereby possible to monitor the rotation speed in a rotation speed band which extends in FIG. 9 above and below target rotation speed 69 and whose width is a function of the instantaneous target rotation speed. This allows excellent monitoring of a motor for faulty rotation speeds.

Figure 11:
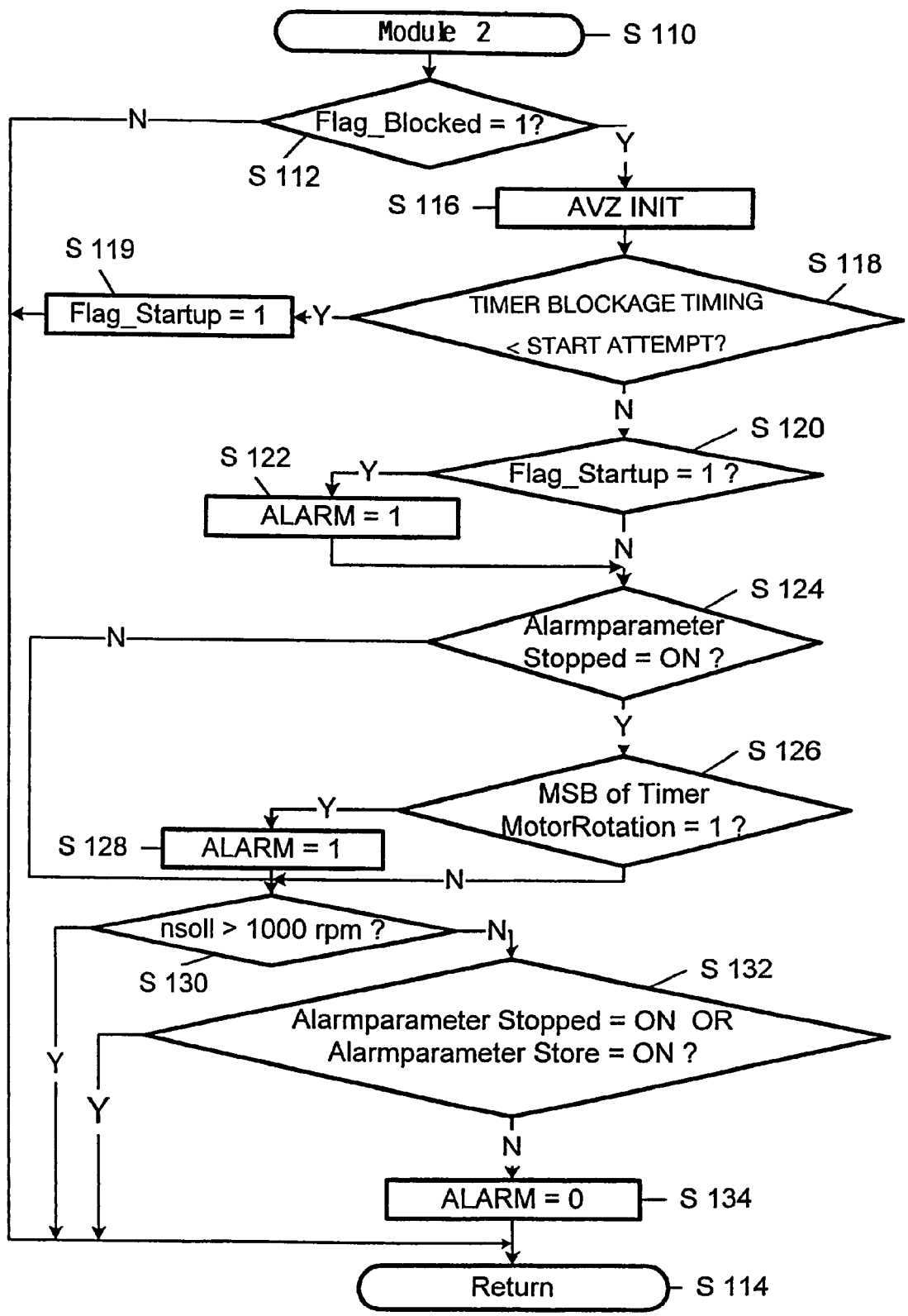
FIG. 11 is a flow chart of the second module of a preferred program for generating alarm signals.

FIG. 11 shows the second module S110. This is executed after the first module S80.

Figure 12:
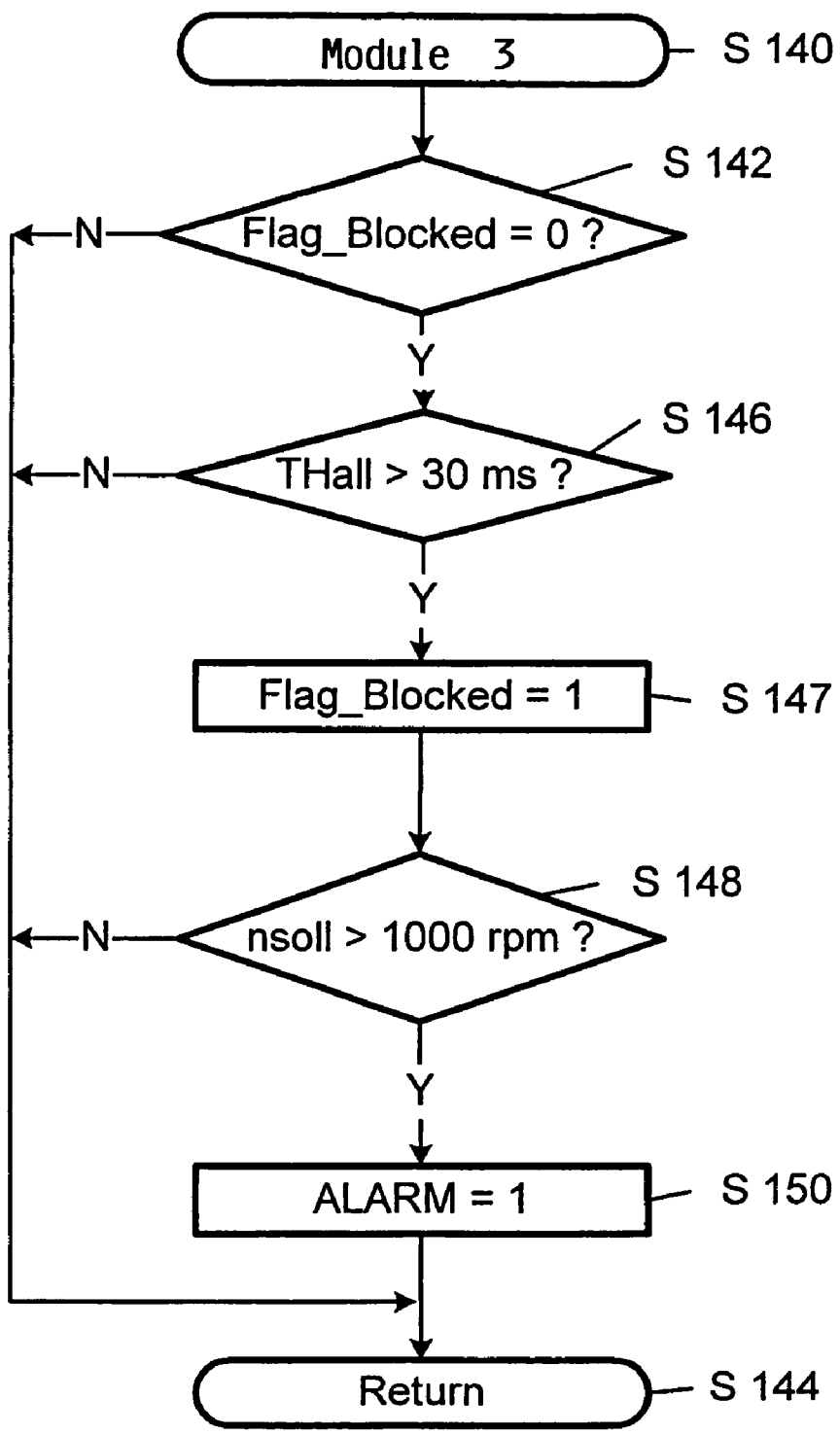
FIG. 12 is a flow chart of the third module of a preferred program for generating alarm signals.

If rotor 50 is being prevented from rotating, or if the user gives the instruction that rotor 50 is not to rotate, both cases are referred to as "blocked mode," and a flag called Flag_Blocked is set to 1, e.g. in S147 of FIG. 12. Module 2 ascertains why the software is in blocked mode, and adapts the alarm signal accordingly.

When the program is in blocked mode, the causes can be as follows:

a) The user has issued a corresponding instruction.

b) The motor is currently attempting to start.

c) The motor has been switched off for a few seconds by the program because its rotation speed was previously too low. This state is referred to as a "blocked off-time." The sequence here is:

Motor is rotating very slowly or is being prevented from rotating.

Blocked off-time of A seconds.

Toward the end of the blocked off-time, an attempt for B seconds to start the motor.

If starting attempt is unsuccessful, another blocked off-time of A seconds.

Etc.

If motor 49 is blocked, this cycle is continuously repeated until the motor starts again, possibly after removal of a mechanical obstacle. Fans in mobile radio installations, for example, are often blocked by mice or rats; and if the mouse can free itself, the motor 49 automatically starts again at the next starting attempt.

Step S112 asks whether the software is in blocked mode. If No, the program goes directly to the end S114 (Return) of module 2 and leaves it.

If the response in S112 is Yes, i.e. if motor 49 is in blocked mode, the program goes to S116, where AVZ 56 is set to zero and started.

S118 then checks whether the motor is currently making a starting attempt; the response is then Yes, and Flag_Startup=1 is then set in S119. This flag is not reset to zero until nist has exceeded a specific value, e.g. 1000 rpm, i.e. the program switches from blocked mode into normal mode. If motor 49 is blocked, it then cannot reach the 1000-rpm rotation speed within the time span of the starting attempt, and after the time for the starting attempt has expired, execution leaves S118 via the No branch and the ALARM signal is triggered in S120, S122, since Flag_Startup is still equal to 1. This flag is initialized with zero. Since the timer in S118 is initially at zero, after a reset the response in S118 is Yes, so that Flag_Startup=1 is then likewise set in S119.

This part of the program thus refers to the case in which starting attempts are unsuccessful, and the ALARM=1 signal is therefore generated directly in S122.

If the response in S118 is No, the motor is currently in a blocked off-time, i.e. it is currently receiving no power. This is ascertained by way of a timer that measures the length of the blocked off-time. When that off-time has expired, motor 49 is switched off and makes a starting attempt.

If the response in S118 is Yes, i.e. if a starting attempt is identified, the program goes via S119 to S114, i.e. to the end of the second module. In this states the ALARM signal is not changed, since it is not yet certain whether the starting attempt will succeed.

If the response in S118 is No, the motor is in a blocked off-time (as defined above), and in S120 the Flag_Startup flag is checked. If this flag has a value of 1, this means that the blocked mode is not intentional (i.e. that the motor is being blocked by external influences), and furthermore that a starting attempt has already been made without success. The ALARM=1 signal is therefore immediately set in S122 if it has not already been set in module 3 (FIG. 12), since motor 49 is being blocked by external influences, and this is a serious fault that must be reported.

Motor 49 can, however, also be deliberately stopped by specifying to it an nSoll or TSoll that is interpreted by the software as rotation speed=0. In this case, execution leaves S120 via No, since in this case no starting attempts are being made, and the program goes to S124. There it checks whether the "stopped" alarm parameter has been enabled. This parameter is set when motor 49 was deliberately stopped but ALARM=1 nevertheless needs to be set. In that case the program goes from S124 to S126. There it checks whether the most significant bit (MSB) in a "MotorRotation" timer is equal to 1. The "MotorRotation" timer senses time $T_{HALL}$ (see FIG. 4), i.e. the time for one quarter of a revolution of rotor 50. If $T_{HALL}$ is sufficiently high that the MSB in this timer is equal to 1, this means that motor 49 is stationary. In that case the program goes to S128, where ALARM=1 is set.

If the MSB is not set in S126, the program goes directly to step S130; likewise subsequent to S128, and also if the response in S124 is No, i.e. if the "stopped" parameter is not activated.

In S130, nSoll or TSoll is monitored. If this value corresponds to a rotation speed of 1000 rpm or less, this means that motor 49 is to be switched off, for example because in a mobile radio installation, no cooling is necessary in winter. The program then goes to S132, where it checks whether one of the alarm parameters "Stopped" or "Store" is activated. If No, the program goes to step S134 where the alarm is deactivated, and then to S114. If the response at S130 is Yes (nSoll>1000 rpm), or if the response at S132 is Yes, the program goes directly to S114, i.e. to the end of module 2, and the ALARM=1 signal remains stored.

FIG. 12 shows module 3 (S140), in which the transition from normal mode to blocked mode is monitored. S142 checks whether Flag_Blocked has a value of zero, i.e. whether the motor is running normally. If No, the program goes directly to S144 (Return), i.e. to the end of this module.

If the response in S142 is Yes, the program goes to S146 where it checks whether the Hall time $T_{HALL}$ (FIG. 4) is greater than 30 ms. $T_{HALL}$ corresponds to the time for one quarter of a revolution, and in this case 0.12 second is consequently required for one complete revolution. According to equation (2), this means a rotation speed of 60/0.12=500 rpm. When a value greater than 30 ms is measured in S146, this therefore means that nist is less than 500 rpm, and in S147 Flag_Blocked is therefore then set to 1 to indicate that nist is too low. The program then goes to S148 and checks whether nSoll>1000 rpm. This means that motor 49 should be rotating at nSoll, but according to S146 is not doing so. The alarm is therefore activated directly in S150.

If it is found in S146 that the value is less than or equal to 30 ms, the program then goes directly to S144; the same occurs if nSoll<1000 rpm, since this is then interpreted by the software to mean that a rotation speed of zero is specified.

Figure 13:
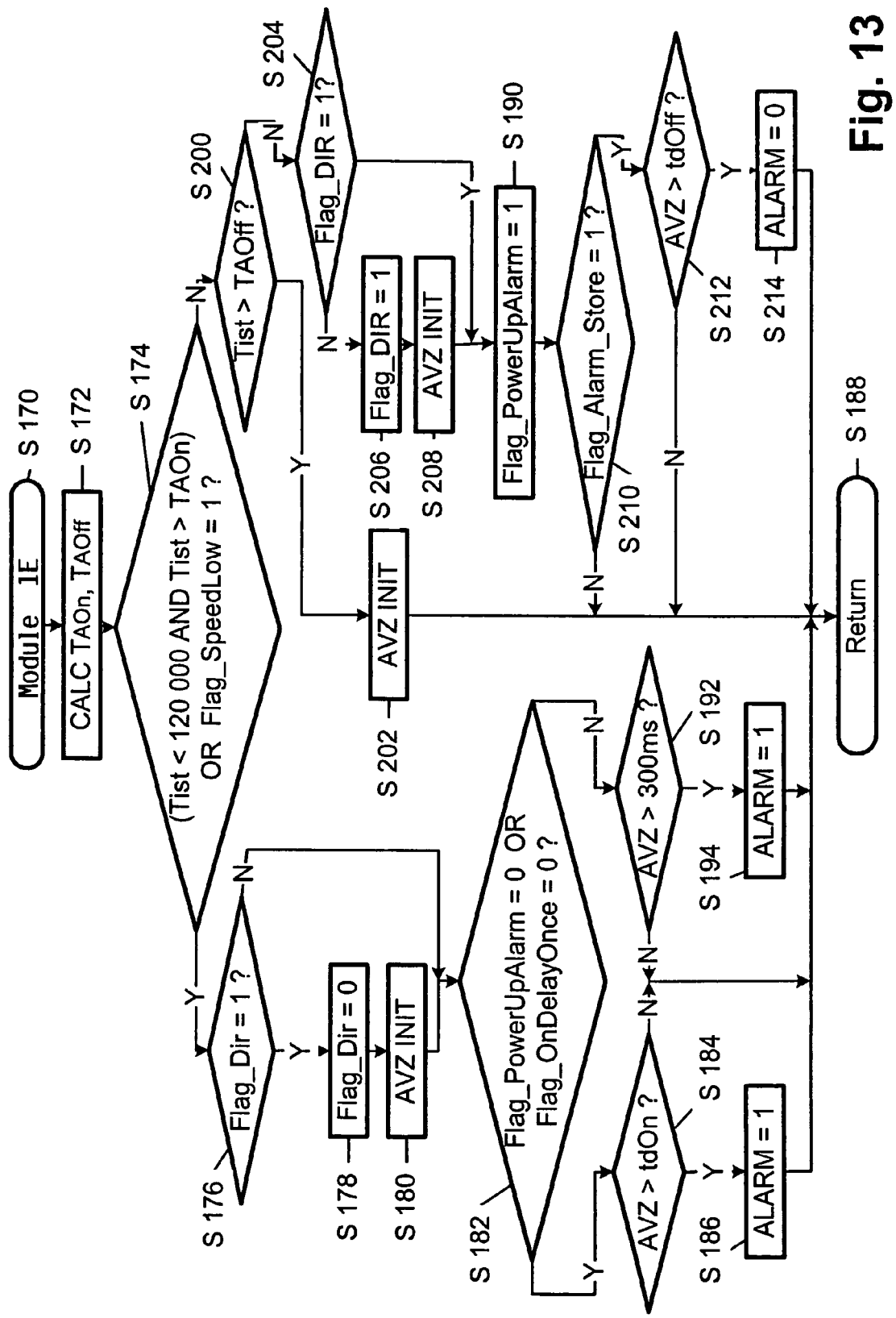
FIG. 13 is a variant of FIG. 11 which has more functions than the simpler variant according to FIG. 11.

FIG. 13 shows, as a variant of FIG. 5 or 6, an expanded module 1E with additional functions. This is designated as S170. Firstly, in S172, alarm limits TAOn, TAOff are inputted or calculated in the manner described. Then, in S174, three conditions are tested, namely first whether the actual rotation speed is greater than 500 rpm, then whether the actual rotation speed is less than alarm switch-on rotation speed nAOn, and lastly whether a Flag_SpeedLow is set. The latter is set if motor 49 is in the blocked mode, which has already been described.

If module 1E leaves step S174 via the Yes branch, the preconditions for setting the ALARM signal are then met.

Step S176 checks whether a flag called Flag_DIR is set. This indicates the direction in which the rotation speed is changing, i.e. whether it is decreasing or increasing.

FIG. 1 shows that rotation speed nist changes, between t1 and t2, in the direction toward rotation speed nAOn. At t2, this rotation speed falls below nAOn for the first time, and at this "limit excursion" Flag_DIR is therefore set to zero.

If, on the other hand, the rotation speed is behaving as shown in the time segment from t3 to 4 of FIG. 1, it is then rising toward nAOff. At time t4 it exceeds nAOff, and Flag_DIR=1 is set at this limit excursion.

This flag is polled in S176. If it is set, then rotation speed nist was still greater than nAOn at the last pass and has now fallen below that limit, since according to S174 Tist>TAOn; execution leaves S176 via the Yes branch, and in S178 this flag is set to zero, since the rotation speed has decreased.

In S180, AVZ 56 is set to zero and started. The routine then goes to S182.

Since Flag_DIR now has a value of zero, steps S178 and S180 are not run through again as long as rotation speed nist does not rise above nAOff; instead, in this case, execution leaves S176 via the No branch and goes directly to S182.

Here two alarm settings are polled.

A flag named PowerUpAlarm is set to zero at a reset or an initialization (FIG. 15) and then causes the program to leave S182 via the Yes branch and go to S184. There AVZ 56 is monitored as to whether it has reached time tdOn (FIG. 1C). The AVZ is cyclically incremented while the motor is running, so that in S184 it becomes greater than tdOn at some time. ALARM=1 is then set in S186. If tdOn has not yet been reached, the routine goes to the end S188 (Return) of module 1E.

The purpose of the PowerUpAlarm flag that is polled in S182 is to allow the alarm delay time to expire once at startup of motor 49. The flag is set to 1 at S190 in FIG. 13 when, at startup, the rotation speed of motor 49 rises above rotation speed nAOff.

In S184 another flag called Flag_OnDelayOnce is polled. This is a parameter that is set as the customer desires, for example by the factory, either to 1 or to 0. If generation of an alarm signal at startup of the motor is to be suppressed, but if the ALARM signal is to be generated immediately during normal motor operation, this flag is set to 1.

This function is particularly important for fans because a fan is braked by its blades when starting, so that the ALARM=1 signal would be briefly generated at startup, even though no fault exists.

For some applications, this Flag_OnDelayOnce is set to 0, since many customers want an alarm to be displayed only after a certain delay period, so that brief faults that, so to speak, "repair themselves" are not displayed.

If this flag equals zero, the program always leaves S182 via the Yes branch to step S184, where the alarm delay time is monitored.

If this flag equals one, the alarm delay time is activated in S184, S186 only until Flag_PowerUpAlarm is set to 1 in S190. At that time execution leaves S182 via the No branch and goes to the monitoring of AVZ 56 in S192. A minimum value of approximately 0.3 second is specified for time tdOn in S192. This makes the alarm sensing process more robust in terms of other faults, e.g. errors in the measurement of Tist or the calculation of TSoll. If the 300-ms limit is exceeded, then the ALARM=1 signal is set in S194.

In the flow chart of FIG. 13, the program parts on the right side are executed when the ALARM signal needs to be deactivated, or when the rotation speed is decreasing and nist is still greater than rotation speed nAOn, i.e. Tist<TAOn. In that case the program goes from S174 to S200 and there checks whether the actual rotation speed nist is still less than nAOff, i.e. whether Tist>TAOff. If Yes, the actual rotation speed lies in the hysteresis zone between rotation speeds nAOn and nAOff. In that case AVZ=0 is set in S202, and AVZ 56 begins to count.

The reason for this is the following: If the rotation speed has dropped below naOn in FIG. 1, the program is at a time shortly after t2. This is therefore when delay time tdOn begins in FIG. 1C. If rotation speed 20 rises again above nAOn during tdOn, no alarm shall be activated. AVZ 56 must therefore be continuously reset to zero by S202. An alarm is therefore activated only when the actual rotation speed remains below rotation speed nAOn for a time longer than tdOn. This is explained below with reference to FIG. 14.

When rotation speed 20 has risen above nAOff at time t4 in FIG. 1, the alarm must be deactivated, provided the customer has not requested permanent storage of the alarm. The deactivation is preferably accomplished with a delay tdOff that, if applicable, can also be set to zero.

Since, in this cases nist has become greater than nAOff (i.e. Tist<TAOff), the program goes from S200 to S204 where Flag_DIR (already explained) is polled. Since nist has risen above the limit nAOff, Flag_DIR must have a value of 1, corresponding to a "healthy" rotation speed. If that is not the case, the program then goes to S206 where Flag_DIR is given the value 1, indicating a rising trend in the rotation speed. In S208, AVZ 56 is then reset to zero, and a new delay time measurement begins.

Figure 15:
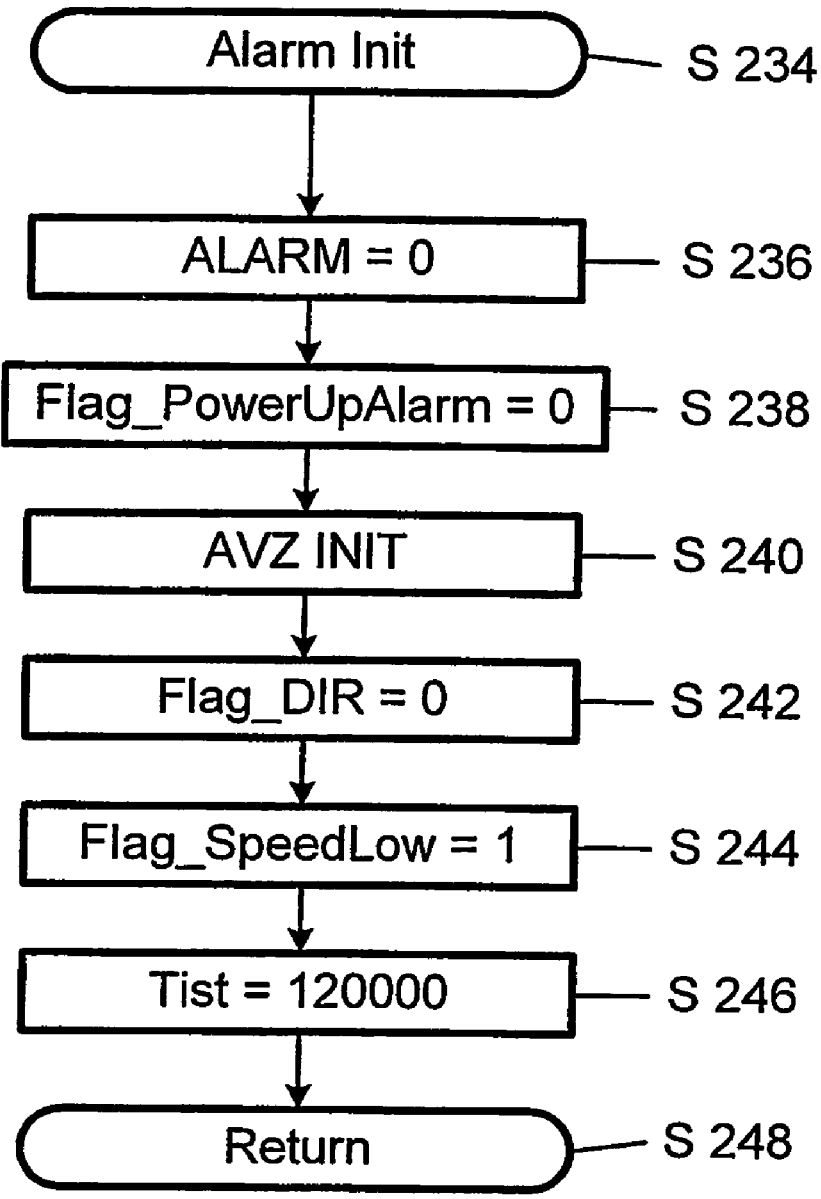
FIG. 15 depicts an initialization routine.

Flag_PowerUpAlarm (already explained) is then set to 1 in S190, since the increase above the nAOff limit means that the starting phase of motor 49 can be considered complete. Flag_PowerUpAlarm is set to zero upon initialization (FIG. 15).

Subsequent to S190 the program goes to S210, where it polls a parameter Flag_Alarm_Store that is defined by the customer upon ordering. If this parameter has a value of zero, an alarm signal must not be canceled once it has been activated. In this case the program therefore leaves S210 via the No branch, and goes to S188.

If this parameter has a value of 1, however, the program then goes from S210 to S212, where it checks whether delay time tdOff has expired; if so, ALARM=0 is set at S214, i.e. the alarm signal is deactivated.

As a result of Flag_DIR (see S176, 178, 204, 206), the execution of this program section is simple and fast.

Figure 14:
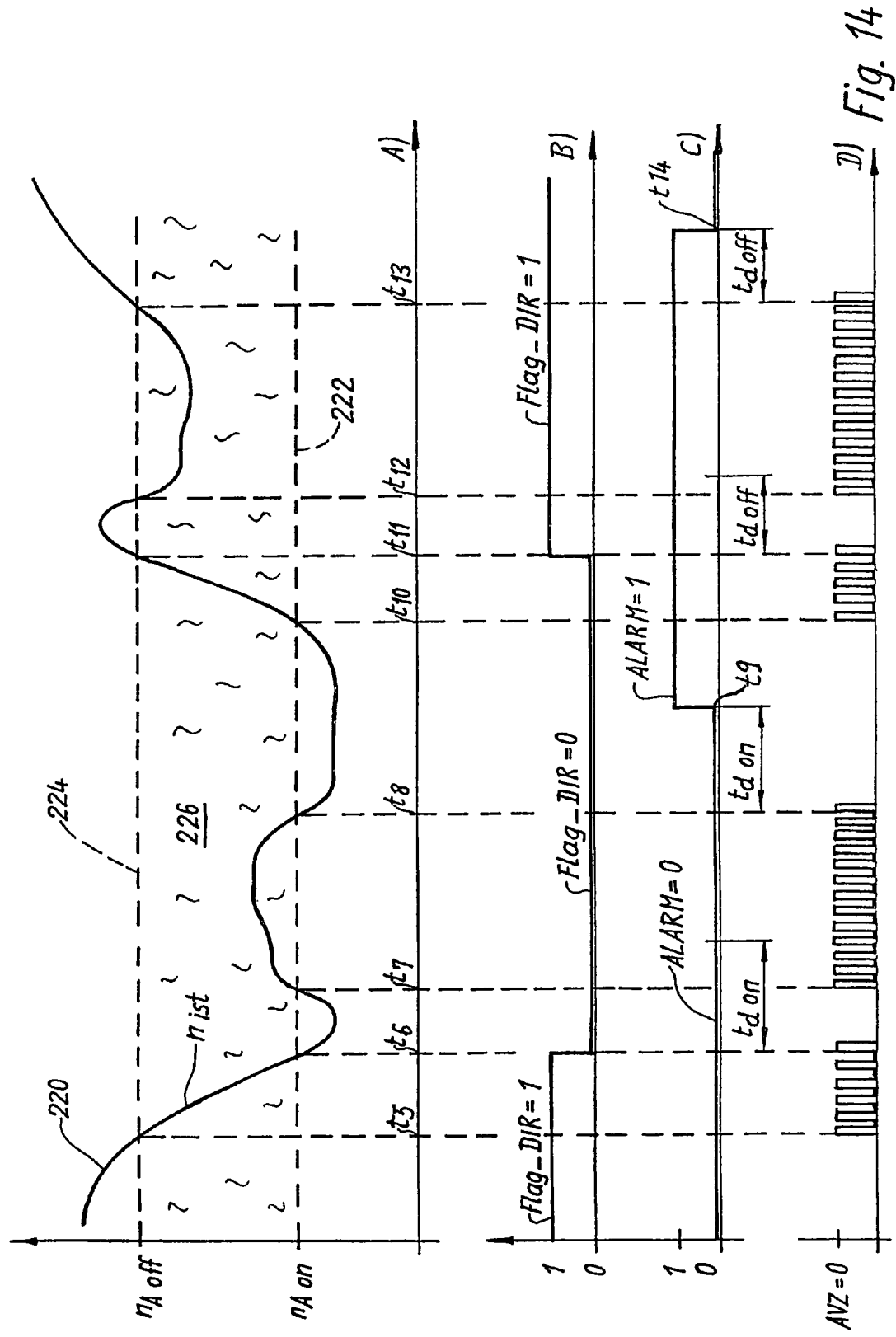
FIG. 14 is a depiction analogous to FIG. 1, explaining the manner of operation of FIG. 13.

FIG. 14 explains the operations in the flow chart of FIG. 13, using an example.

The profile of the actual rotation speed nist is designated 220. For didactic reasons, this profile is depicted so that many functions can be explained with reference to it. The (constant) alarm switch-on rotation speed nAOn is labeled 222, the (constant) alarm switch-off rotation speed nAOff 224, and the hysteresis zone located between them is designated 226.

To the left of time t5, nist has a value in the normal region; the direction flag Flag_DIR therefore has a value of 1, and the ALARM signal has a value of 0.

Between times t5 and t6, the rotation speed is in hysteresis zone 226; as a result, execution cycles continuously through steps S174, S200, S202 in FIG. 13, causing alarm delay counter AVZ 56 (as shown in FIG. 14D) to be continuously reset to zero (i.e. AVZ=0), for example every 100 µs. This prevents an alarm from being triggered when nist has a value in hysteresis zone 226, i.e. changes in the ALARM signal are deactivated in hysteresis zone 226.

At time t6, rotation speed 220 drops below nAOn; as a result, direction flag Flag_DIR is switched over here to zero by S178, causing AVZ 56 to be set to zero in S180 so that the AVZ begins its time measurement, for example a time tdOn of one minute.

At time t7, e.g. after 30 seconds and before an alarm might be triggered, rotation speed 220 returns to hysteresis zone 226, causing AVZ 56 (see FIG. 14D) once again to be periodically reset to zero, e.g. every 100 µs. This continues until time t8, where the rotation speed once again drops below nAOn; according to steps S184 and S186 in FIG. 13, this causes the AVZ to be switched on and, after the expiration of time tdOn at time t9, results in an activation of the alarm (ALARM=1).

At time t10, rotation speed 220 returns to hysteresis zone 226, causing the program once again to cycle periodically through steps S174, S200, S202; at time t11, alarm switch-off rotation speed nAOff is exceeded, so that in S206 of FIG. 13 a switchover to Flag_DIR=1 is caused, and in S208 alarm delay counter AVZ 56 is set to zero and started.

Shortly thereafter, at time t12, rotation speed 220 returns to hysteresis zone 226; this causes (via S202) a periodic resetting of the AVZ to zero, so that the alarm is not cancelled.

At time t13, rotation speed 220 returns to the normal region (above rotation speed 224), and at time t14, after time tdOff has expired, the alarm is canceled (ALARM=0).

It is therefore apparent that the ALARM=1 signal is generated only when rotation speed 220 has fallen in sustained fashion into the "red zone" (below 222); that it is canceled only when rotation speed 220 has returned in sustained fashion to the "green zone" (above 224); and that in hysteresis zone 226, the signals depicted in FIG. 14D cause changes in a pre-existing alarm signal to be deactivated, i.e. if the state was ALARM=1, it remains ALARM=1, and likewise for ALARM=0. The ability of ALARM to change is therefore blocked or deactivated in hysteresis zone 226, preventing frequent switchovers of the ALARM signal.

FIG. 15 shows the procedure S234 upon initialization. An initialization occurs after motor 49 is switched on, and in the event of a reset operation. In step S236 the alarm signal is set to zero, since at startup it is assumed that motor 49 is OK. This is also intended to provide the possibility of canceling an alarm, by switching the motor off and on again, even when Flag_Alarm Store in S210 prevents automatic cancellation of an alarm signal.

In S238, Flag_PowerUpAlarm is set to zero; this was explained with reference to S182 and becomes effective in S182 at startup of motor 49.

In S240, alarm delay counter AVZ 56 is set to zero and started; and in S242 Flag_DIR is given the value 0, by analogy with S178 of FIG. 13.

In S244, Flag_SpeedLow is set to 1, since this flag is intended to indicate that the rotation speed is less than 500 rpm, and because the rotation speed at startup is less than 500 rpm.

In S246, Tist is set to equal 120,000 (μs). This causes the computer to work at startup with a fictitious rotation speed of 500 rpm. This is necessary because otherwise a very long time Tist would be measured at startup (because of the low rotation speed), and that time might possibly be too long for the registers and could cause a fault.

At S246, routine S234 then ends with S248 (Return).

Many variants and modifications are of course possible within the scope of the present invention. For example, the invention can also be used with an unregulated motor if the latter's rotation speed lies in a definable normal zone above or below which it does not go during fault-free operation.

What is claimed is:

1. A method of generating an alarm signal in a motor that comprises a rotor whose rotation speed is to be regulated to a rotation speed target value, comprising the steps of:

proceeding from an instantaneous rotation speed target value, calculating, at time intervals, an alarm switch-on rotation speed that has a predetermined relationship to the instantaneous rotation speed target value;

at the time intervals, making a check as to whether the actual rotation speed of the motor lies in a region that is outside a region defined by the rotation speed target value and the alarm switch-on rotation speed, and is on a side of that region away from the rotation speed target value;

if such is the case, generating an alarm switch-on criterion.

2. The method according to claim 1,
further comprising, after generation of an alarm switch-on criterion, monitoring a time period which has elapsed since generation of that criterion.

3. The method according to claim 2,
further comprising the step of
generating an alarm signal when the monitored time period exceeds a predetermined value.

4. The method according to claim 1, comprising the following additional steps:

in addition to the alarm switch-on rotation speed, calculating, at the time intervals, an alarm switch-off rotation speed, which lies between the instantaneous rotation speed target value and the instantaneous alarm switch-on rotation speed and, together with the latter, defines a hysteresis zone;

at the time intervals, making a check as to whether a change has occurred in the actual rotation speed of the motor, out of the hysteresis zone into a region between the alarm switch-off rotation speed and rotation speed target value; and if such is the case, generating an alarm switch-off criterion.

5. The method according to claim 4, further comprising
after generation of the alarm switch-off criterion, monitoring a time period elapsed since generation of the criterion.

6. The method according to claim 5,
further comprising terminating generation of the alarm signal when the monitored time period exceeds a predetermined value.

7. The method according to claim 1, further comprising
using a time, that the rotor requires, at the relevant rotation speed, to travel through a predetermined rotation angle, as the rotation speed value.

8. The method according to claim 7,
further comprising
using a target time to represent the rotation speed target value; and
calculating an alarm time that has a predetermined relationship to the target time for use in generating an alarm criterion.

9. The method according to claim 8, further comprising
calculating an alarm time by adding to or subtracting from a target time a correction value that is determined by dividing the target time by a fixed value.

10. The method according to claim 9, further comprising
using a number from the series . . . $\frac{1}{16}$, $\frac{1}{8}$, $\frac{1}{4}$, $\frac{1}{2}$, 1, 2, 4, 8, 16, 32 . . . as the fixed value.

11. The method according to claim 10, further comprising
applying a shifting operation to a binary base value, in order to generate the fixed value.

12. A method of generating an alarm signal in a motor which comprises a rotor whose actual rotation speed during operation lies in a normal zone, can deviate from that normal zone if a malfunction happens, said motor to be monitored for occurrence of a fault state, comprising the steps of:

defining at least one alarm switch-on rotation speed and at least one alarm switch-off rotation speed, of which said alarm switch-off rotation speed is located closer to the normal zone than said alarm switch-on rotation speed, an associated pair of alarm switch-on rotation speed and alarm switch-off rotation speed defining, between them, a hysteresis zone;

generating an alarm switch-on criterion when the rotation speed to be monitored arrives, coming from the hysteresis zone, at the alarm switch-on rotation speed;

beginning with its generation, monitoring a duration of the alarm switch-on criterion; and when the duration reaches a predetermined value, activating an alarm signal.

13. The method according to claim 12, further comprising monitoring the rotation speed to be monitored as to whether it assumes, during monitoring of the duration of the alarm switch-on criterion, a value in the hysteresis zone; and, if so, deactivating monitoring of said duration.

14. The method according to claim 12, further comprising, when, after generation of an alarm signal, the rotation speed to be monitored arrives, coming from the hysteresis zone, at the alarm switch-off rotation speed, generating an alarm switch-off criterion and monitoring a duration from its generation; and when the duration reaches a predetermined value, deactivating the alarm signal.

15. The method according to claim 14, further comprising monitoring the rotation speed to be monitored as to whether it assumes, during monitoring of the duration of the alarm switch-off criterion, a value in the hysteresis zone;

and, if so, deactivating monitoring of the duration.

16. The method according to claim 14, further comprising before deactivation of the alarm, making a check as to whether an instruction for permanent storage of an activated alarm is present, and, if so, suppressing deactivation of the alarm signal.

17. The method according to claim 12, further comprising at startup of the motor, generating a criterion, which increases, at startup, a predetermined value of a time period allotted for activation of the alarm signal.

18. The method according to claim 17, further comprising cancelling said increase of said predetermined value of said allotted time period when the alarm switch-on criterion is reset.

19. The method according to claim 12, wherein the alarm switch-on criterion has a value which is the inverse of a value of an alarm switch-off criterion that is generated before a switched-on alarm signal can be switched off.

20. The method according to claim 12, wherein a rotation speed that is specified to the motor by means of a rotation speed target value is defined as a normal value of the rotation speed to be monitored.

21. The method according to claim 20, wherein the alarm switch-on rotation speed has a predetermined relationship to the rotation speed target value.

22. The method according to claim 20, wherein the alarm switch-off rotation speed has a predetermined relationship to the rotation speed target value.

23. The method according to claim 12, wherein for characterization of the rotation speed target value, a target time is used; and for characterization of a value used for generation of an alarm criterion, an alarm time that has a predetermined relationship to the target time is calculated.

24. The method according to claim 23, wherein the alarm time is calculated by adding to or subtracting from the target time a correction value that is derived by dividing the target time by a fixed value.

25. The method according to claim 24, further comprising using a number from the series . . . $1/16, 1/8, 1/4, 1/2, 1, 2, 4, 8, 16, 32$ . . . as the fixed value applied as a divisor to the target time.

26. A motor comprising an arrangement for monitoring a deviation of the actual rotation speed of the motor from a normal zone, which motor comprises:

a rotation speed sensor for sensing a value characterizing an actual rotation speed of the motor;

an alarm apparatus which is configured to compare the actual rotation speed with a predetermined alarm switch-on rotation speed and with an alarm switch-off rotation speed different therefrom, which rotation speeds define between them a hysteresis zone, and to activate an alarm switch-on criterion upon reaching the alarm switch-on rotation speed;

and comprising a timing member for monitoring the alarm switch-on criterion, which timing member is configured to activate an alarm signal after the alarm criterion was activated during a predetermined time period.

27. The motor according to claim 26, which is implemented as an electric motor.

28. The motor according to claim 26, wherein an apparatus is provided which monitors the actual rotation speed as to whether it assumes a value in the hysteresis zone after the alarm switch-on rotation speed is reached and after the alarm switch-on criterion is generated;

and which, in that case, deactivates said step of activating the alarm signal.

29. The motor according to claim 26, wherein the alarm apparatus is configured such that after activation of the alarm switch-on criterion, said alarm apparatus activates an alarm switch-off criterion when the actual rotation speed, coming from the hysteresis zone, reaches the alarm switch-off rotation speed.

30. The motor according to claim 29, wherein a timing member for monitoring the alarm switch-off criterion is provided, said timing member being implemented to deactivate the alarm signal after the alarm switch-off criterion was activated during a predetermined time span.

31. The motor according to claim 30, wherein an arrangement is provided for monitoring the actual rotation speed as to whether it assumes a value in the hysteresis zone after the alarm switch-off rotation speed is reached and after the alarm switch-off criterion is generated, and which, if so, deactivates said step of deactivating the alarm signal.

32. The motor according to claim 26, further comprising a rotation speed controller in order to regulate the actual rotation speed to a desired rotation speed target value, and an arrangement that automatically adapts the alarm switch-on rotation speed and alarm switch-off rotation speed to the rotation speed target value as a function of a magnitude of the target value.

33. The motor according to claim 32, wherein the arrangement is configured to assign to the alarm switch-on rotation speed a value that is substantially a first percentage of the rotation speed target value.

34. The motor according to claim 32, wherein the arrangement is configured to assign to the alarm switch-off rotation speed a value that is substantially a second percentage of the rotation speed target value.

35. The motor according to claim 34, wherein the first and the second percentages differ from one another, in order to constitute a hysteresis zone upon activation and deactivation of the alarm signal.

* * * * *

UNITED STATES PATENT AND TRADEMARK OFFICE
CERTIFICATE OF CORRECTION

| | | |
|---|---|---|
| PATENT NO. | : 7,075,446 B2 | Page 1 of 1 |
| APPLICATION NO. | : 10/489399 | |
| DATED | : July 11, 2006 | |
| INVENTOR(S) | : Schondelmaier et al. | |

It is certified that error appears in the above-identified patent and that said Letters Patent is hereby corrected as shown below:

On the patent cover, under Inventors Item (75), delete "Georgen (DE)" and substitute --St. Georgen (DE)--

In column 15, line 24, delete "Flag_Alarm Store" and substitute --Flag_Alarm_Store--.

Signed and Sealed this

Fifteenth Day of May, 2007

JON W. DUDAS
*Director of the United States Patent and Trademark Office*